US007127491B2

(12) United States Patent
Zirnstein, Jr.

(10) Patent No.: US 7,127,491 B2
(45) Date of Patent: Oct. 24, 2006

(54) REMOTE COMMAND SERVER

(75) Inventor: Robert Charles Zirnstein, Jr., Foothill Ranch, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 886 days.

(21) Appl. No.: 10/200,137

(22) Filed: Jul. 23, 2002

(65) Prior Publication Data

US 2004/0019643 A1   Jan. 29, 2004

(51) Int. Cl.
G06F 15/16   (2006.01)
(52) U.S. Cl. .................................. 709/206; 709/229
(58) Field of Classification Search ............... 709/203, 709/206, 217, 219, 229
See application file for complete search history.

(56) References Cited

U.S. PATENT DOCUMENTS

| | | | | |
|---|---|---|---|---|
| 5,937,160 | A * | 8/1999 | Davis et al. ............... | 709/203 |
| 5,949,412 | A | 9/1999 | Huntsman .................. | 345/329 |
| 6,061,797 | A | 5/2000 | Jade et al. ................. | 713/201 |
| 6,185,604 | B1 * | 2/2001 | Sekiguchi .................. | 709/206 |
| 6,289,378 | B1 | 9/2001 | Meyer et al. .............. | 709/223 |
| 6,343,311 | B1 * | 1/2002 | Nishida et al. ............ | 709/203 |
| 6,374,406 | B1 * | 4/2002 | Hirata ....................... | 725/132 |
| 6,449,343 | B1 * | 9/2002 | Henderson ............... | 379/88.14 |
| 6,697,942 | B1 * | 2/2004 | L'Heureux et al. ........ | 713/152 |
| 6,741,855 | B1 * | 5/2004 | Martin et al. .............. | 455/419 |
| 6,751,670 | B1 * | 6/2004 | Patterson ................... | 709/229 |
| 6,792,321 | B1 * | 9/2004 | Sepe, Jr. ................... | 700/65 |
| 6,868,498 | B1 * | 3/2005 | Katsikas .................... | 726/14 |
| 6,925,481 | B1 * | 8/2005 | Singhal et al. ............ | 709/200 |
| 2001/0003827 | A1 * | 6/2001 | Shimamura ............... | 709/206 |

FOREIGN PATENT DOCUMENTS

| | | |
|---|---|---|
| JP | 11-341338 | 12/1999 |
| JP | 2002-091890 | 3/2002 |
| JP | 2002-142270 | 5/2002 |
| JP | 2002-182923 | 6/2002 |

OTHER PUBLICATIONS

Symantec, Inc., "pcAnywhere 11.0", http://www.symantec.com/pcanywhere/Consumer/features.html, Sep. 16, 2003.
"Symantec pcAnywere 10.0—fast and secure remote access to PCs and servers", Symantec Enterprise Administration © 2001.
"GoToMyPC", https://www.gotomyoc.com/ourTechnology.tmpl?SessionInfo+48877571ECB9747E046414..., Experticity, Inc., Sep. 16, 2003.

(Continued)

Primary Examiner—William C. Vaughn, Jr.
Assistant Examiner—Yemane M. Gerezgiher
(74) Attorney, Agent, or Firm—Fitzpatrick, Cella, Harper & Scinto

(57) ABSTRACT

Providing control of a first computing device from a second computing device, including accessing an electronic message received by an electronic message application in the first computing device from the second computing device, extracting a command from the received electronic message, selecting from a plurality of function calls at least one function call corresponding to the extracted command, initiating execution of the at least one function call, obtaining output data from each executed function call, composing an output electronic message for each executed function call, the output electronic message being directed to a specific address and containing the output data from the executed function call, and sending each output electronic message via the electronic message application to the specific address.

35 Claims, 15 Drawing Sheets

OTHER PUBLICATIONS

"GoToMyPC: Making Life Simpler for Remote and Mobile Workers", Expertcity, Inc. © 2003.

"L-Soft products—LISTSERV® e-mail list management software", http:www.lsoft.com/products/listserv.asp, Sep. 16, 2003.

* cited by examiner

_130_

```
✉ RE: CMD: DOS: dir - Message (Plain Text)                    _ ☐ ☒
File  Edit  View  Insert  Format  Tools  Actions  Help From:     Zimstein, Rob                    Sent: Fri 6/7/2002 11:07 AM
To:       Zimstein, Rob
Cc:
Subject:  RE: CMD: DOS: dir
```

_131_

C:\Program Files\Common Files\System\Mapi\1033\NT>dir
Volume in drive C is LOCAL DISK
Volume Serial Number is 07CF-0805

Directory of C:\ProgramFiles\CommonFiles\System\Mapi\1033\NT

_132_

```
05/02/2001 04:45p    <DIR>          .
05/02/2001 04:45p    <DIR>          ..
11/03/1998 02:33p          143,360 CNFNOT32.EXE
02/26/1999 03:40a          122,931 CONTAB32.DLL
02/10/1999 05:09a          127,488 EMSUI32.DLL
01/21/1999 06:57a           81,967 MINET32.DLL
11/14/1998 12:16a           73,891 EXCHNG.HLP
01/07/2002 02:31p           10,994 MAPISVC.INF
03/03/1999 03:45a          776,192 OUTEX.DLL
12/09/1998 02:53a          113,424 ESCONF .DLL
02/26/1999 04:41a          333,312 EXSEC32.DLL
03/17/1999 03:10a          576,000 EMSMDB32.DLL
02/26/1999 04:41a          150,528 EMSABP32.DLL
01/20/1999 09:20p           32,818 DUMPSTER.DLL
12/09/1998 02:53a           60,176 SCRPTXTN.DLL
12/09/1998 02:53a           21,504 INETAB32.DLL
12/23/1998 10:11p           58,640 MLCFG32.CPL
03/10/1999 03:20a          813,056 MSMAPI32.DLL
03/13/1999 01:02a          595,968 MSPST32.DLL
02/23/1999 07:21p           57,344 NEWPROF.EXE
02/23/1999 07:20p           98,304 GAPI32.DLL
11/06/1998 06:38p          286,720 MMFMIG32.DLL
02/23/1999 07:20p           32,768 MAPISP32.EXE
03/04/1998 08:01p            6,752 CMC.DLL
01/26/1999 07:55p          131,072 MAPI32.DLL
02/25/1998 10:34p           10,091 SCANPST.HLP
11/06/1998 06:38p          318,976 SCANPST.EXE
04/22/2002 11:11a           61,106 FIDEFINE.H
          26 File(s)     5,095,382 bytes
           2 Dir(s) 167,837,696 bytes free
```

```
✉ RE: CMD: WEB: HTTP://www.ietf.org - Message (Plain Text)    _ ☐ ✕
File  Edit  View  Insert  Format  Tools  Actions  Help From:    Zirnstein, Rob              Sent: Fri 6/7/2002 3:27 PM
To:      Zirnstein, Rob
Cc:
```
141 — Subject: RE: CMD: WEB: HTTP://www.ietf.org 142 —
```
I<html>
 <head>
 <title>IETF Home Page</title>
 </head>
 <body bgcolor="#ffffff" >

<P><BR>       <A
 HREF="ietf-sites.html"><B>IETF Mirror Sites</B></A><BR>

<center>
 <!---
 <img src="/images/ribbon.gif" hspace="3" border="0" alt="">
 --->
 <img src="images/ietflogo2e.gif" height="160" width="280">
 <br clear=all>
```

FIG. 9

E-MAIL ADDRESS DATABASE 61

| E-MAIL ADDRESS 160 | ACCESS ALLOWED 161 | ACCESS LEVEL 162 |
|---|---|---|
| ZIRNSTEIN@EMAIL.COM | YES | 0 |
| FRIEND1@EMAIL.COM | YES | 1 |
| SNOOPY@EMAIL.COM | YES | 2 |
| FRIEND2@EMAIL.COM | YES | 3 |
| HACKER@EMAIL.COM | NO | n/a |

FIG. 11

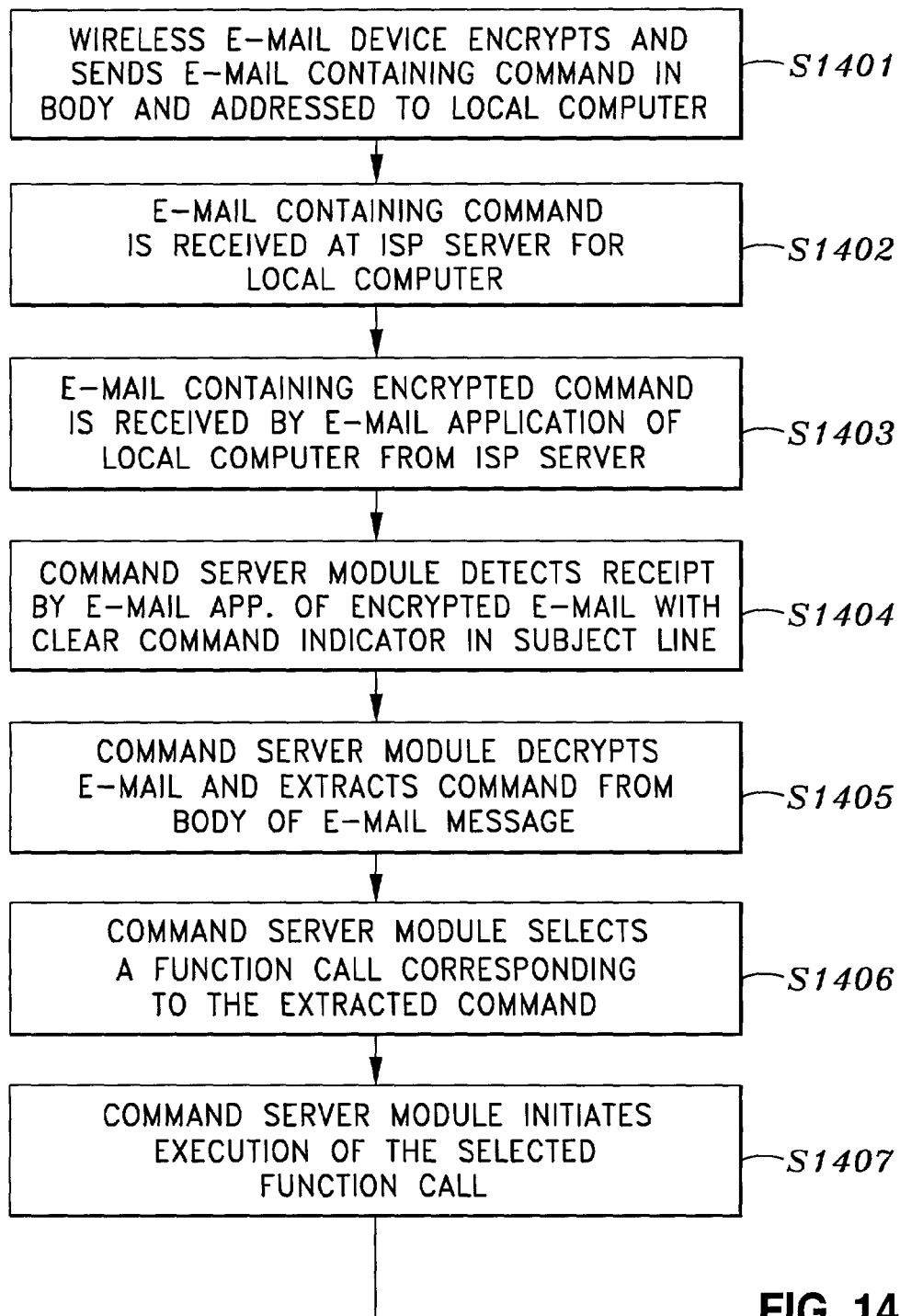

REMOTE COMMAND SERVER

BACKGROUND OF THE INVENTION

1. Field of the Invention

The invention concerns providing remote access to a local computer, such as the user's home computer, via e-mail. A user utilizes the e-mail application of a remote computer, wireless device, such as a wireless telephone or paging device, or personal digital assistant with a wireless modem, to send commands via e-mail to the local computer. In this manner, the remote user can access the operating system, e-mail application, internet browser and other applications on the local computer, without the need for special software on the remote computer or device.

2. Description of the Related Art

It is often desirable for a user to remotely access a local computer in order to obtain data from the local computer or to execute commands on the local computer and obtain the results from such executed commands. For example, when away from home, a user may want to remotely access the user's home computer to check e-mail messages received on the home computer or to control the e-mail application on the home computer, such as to redirect the user's e-mail messages to another e-mail address. In addition, the user may want to remotely access the home computer in order to access a web page via the web browser on the home computer, or to execute operating system commands on the home computer.

There are many known applications for providing a user with remote access to a local computer, however these known applications have several drawbacks. For example, popular applications for remote access of a local computer require the installation and set-up of proprietary software on both the local computer and the remote computer that will be used to access the local computer. In addition, the known applications typically require the establishment of a unique connection between the local computer and the remote computer. Because a firewall in the local computer, or on the LAN to which the local computer is connected, would prohibit initiating the unique connection by the remote computer, the local computer generally has to initiate the unique connection. This is because a typical firewall prohibits any outside computer or device from initiating a port connection with the local computer hosting the firewall. The only port that is usually accessible through a firewall is the e-mail port, which is a predetermined port number. For remote devices other than computers, such as an e-mail-enabled paging device, there is no ability to download proprietary software or to establish unique connections with a local computer.

Many known applications for remote access of a local computer also require the transfer of a device screen image of the local computer to the remote computer, which requires a high bandwidth connection in order to maintain an adequate representation of the local computer screen image on the remote computer. This transfer of the screen image provides the user of the remote computer with an emulation of the local computer's user display. The remote computer in the foregoing example would need at least the same display capabilities of the local computer. Such a display capability is generally not possible for remote devices other than computers, such as e-mail/web-enabled wireless telephones, wireless personal digital assistants (PDAs), or e-mail-enabled paging devices.

In view of the above, a solution is desirable which allows for access to a local computer by a remote computer without the need for special software on the remote computer and without the need for special connections between the two computers. In addition, the increased use of portable computing devices other than personal computers, such as e-mail/web-enabled wireless telephones, wireless PDAs, and e-mail-enabled paging devices, creates a need to provide remote access to, and control of, a local computer from such portable computing devices.

SUMMARY OF THE INVENTION

The present invention addresses the foregoing problems by providing a remote user with the ability to access a local personal computer, such as the user's home computer, via e-mail. For example, the remote user may utilize the e-mail application of another computer, of a wireless device, such as a wireless telephone or paging device, or of a personal digital assistant with a wireless modem. In this manner, the remote user can access the operating system, e-mail application, internet browser and other applications on the local computer, without the need for special software on the remote computer or device.

Accordingly, one aspect of the invention concerns providing control of a first computing device from a second computing device, including accessing an electronic message received by an electronic message application in the first computing device from the second computing device, extracting a command from the received electronic message, selecting from a plurality of function calls at least one function call corresponding to the extracted command, initiating execution of the at least one function call, obtaining output data from each executed function call, composing an output electronic message for each executed function call, the output electronic message being directed to a specific address and containing the output data from the executed function call, and sending each output electronic message via the electronic message application to the specific address.

Preferably, the received electronic message is encrypted for security purposes and is then decrypted to extract the command. In addition, the received electronic message is preferably accessed through the use of an application program interface for the electronic message application. The specific address of the output electronic message is preferably the e-mail address of the sender of the received electronic message. Also, a command indicator is preferably provided in the received electronic message to indicate a command is received therein, and the command is provided in the body of the received electronic message. Finally, the output electronic message is preferably composed and sent through the use of an application program interface for the electronic message application.

By virtue of the foregoing, a remote user can access and control a local computer through a standard e-mail application without the need for any special software in the remote computing device used by the remote user. The local computer need only have a command server to extract commands from received e-mails and then execute the extracted commands accordingly. The local computer does not need any special connection or high bandwidth for such control because the only connection needed is standard e-mail which is received by the local computer through the standard e-mail port.

According to another aspect, the invention concerns providing control of a first computing device from a second computing device. The invention includes accessing, through an electronic message application function call, an encrypted electronic message received by an electronic message application in the first computing device from the second computing device, the encrypted electronic message having a decrypted subject line containing a command indicator. The body portion of the received electronic message is decrypted and a command from the body portion of the received electronic message is extracted. At least one function call from a plurality of function calls is selected corresponding to the extracted command, the at least one function call being supported by a corresponding program which is hosted in the first computing device. Execution of the at least one function call is initiated, and output data is obtained from the corresponding program for each executed function call. An output electronic message is composed for each executed function call, the output electronic message being directed to an e-mail address of the received electronic message and containing the output data for the executed function call. Each output electronic message is sent, through an electronic message application function call, via the electronic message application to the e-mail address of the received electronic message.

Preferably, the received electronic message is accessed through the use of an application program interface for the electronic message application. Also, the output electronic message is preferably composed and sent through the use of an application program interface for the electronic message application. The invention is preferably implemented in a command server module which is hosted in the first computing device.

By virtue of the foregoing, a remote user can access and control a local computer through a standard e-mail application without the need for any special software in the remote computing device used by the remote user. The local computer need only have a command server to extract commands from received e-mails and then execute the extracted commands accordingly. The local computer does not need any special connection or high bandwidth for such control because the only connection needed is standard e-mail which is received by the local computer through the standard e-mail port.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 8 is an illustrated example of a return e-mail message in response to an operating system command which was sent from a remote device to the local computer according to one embodiment of the present invention.

FIG. 9 is an illustrated example of a return e-mail message in response to a web page request command which was sent from a remote device to the local computer according to one embodiment of the present invention.

FIG. 11 is a block diagram for explaining the structure of an e-mail address database according to a second embodiment of the present invention.

DETAILED DESCRIPTION OF THE PREFERRED EMBODIMENTS

The present invention implements the functionality to provide a remote user with access and control of a local computer through a standard e-mail application in a remote computer or device, such as a wireless e-mail device, e-mail enabled wireless telephone, or wireless e-mail enabled personal digital assistant. The invention is preferably implemented in a command server module in the local computer.

Figure 1:
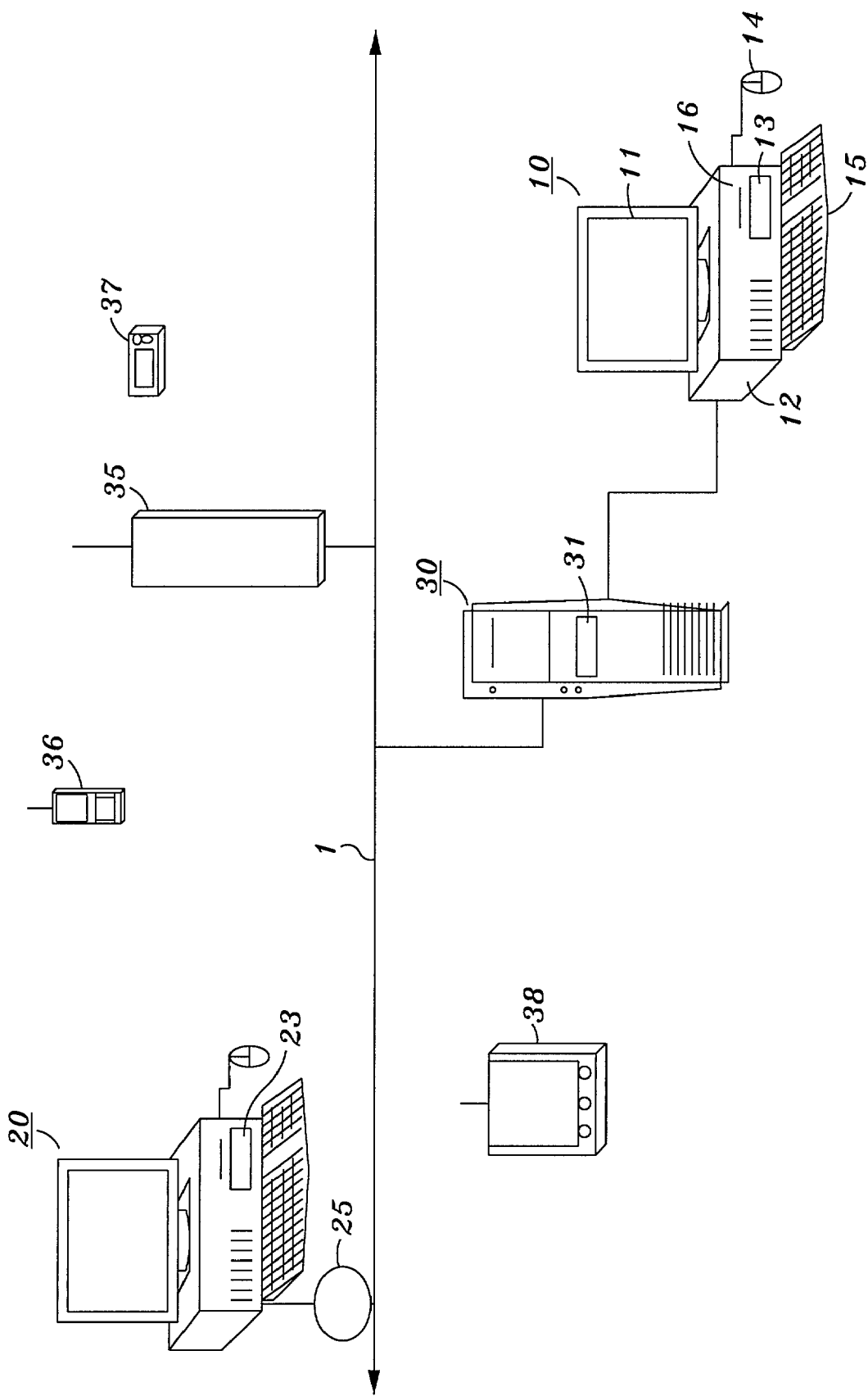
FIG. 1 is a representative view of a computing environment in which the present invention may be implemented according to one embodiment of the invention.

Turning to FIG. 1, a computing environment is shown in which the present invention may be implemented. As seen in FIG. 1, the computing environment includes local computer 10, remote computer 20, gateway 25, network server 30, wireless gateway 35, wireless telephone 36, wireless e-mail device 37, wireless personal digital assistant 38 and connection 1, to which all of the foregoing are connected in some fashion. Connection 1 is the internet, although the invention can be implemented in other embodiments in which connection 1 is a network connection, such as an Ethernet network medium consisting of a bus-type physical architecture, which comprises a local area network (LAN) or a wide area network (WAN).

Local computer 10 and remote computer 20 are preferably typical personal computers or workstations having a windowing operating system environment. As seen in FIG. 1, local computer 10 has display 11, host processor 12, fixed disk 13, mouse 14, keyboard 15, and a floppy drive 16. The contents of fixed disk 13 of local computer 10 according to the present invention are explained in more detail below with respect to FIG. 2. Remote computer 20 is connected to connection 1 via gateway 25 which can be an internet service provider server, or another type of gateway to connection 1. Remote computer 20 is similar to local computer 10 and is therefore not described in detail for the sake of brevity. The contents of fixed disk 23 of remote computer 20 are described below with respect to FIG. 3.

Server 30 is preferably a PC-compatible computer having a windowing operating system environment. Server 30 has a fixed disk 31 which is preferably a large fixed disk for storing numerous files, applications, and data which enable server 30 to function as an internet service provider (ISP) gateway for local computer 10 to access internet connection 1. In this regard, fixed disk 31 of server 30 contains the programs and applications of a typical ISP server, such as web access and e-mail server programs. It can be appreciated that the connection between server 30 and local computer 10 is a typical type of connection such as a dial-up connection, a DSL connection, or a digital cable modem connection.

Wireless gateway 35 is a server which is similar to server 30, but which has the capability to communicate with wireless devices, such as wireless telephone 36, wireless e-mail device 37, and wireless personal digital assistant 38, and provide a gateway for such devices to connection 1. Wireless telephone 36 is a digital wireless telephone which is e-mail enabled for sending and receiving e-mail messages over connection 1 via wireless gateway 35. Similarly, wireless e-mail device 37 is a device such as a digital pager, which can send and receive e-mail messages over connection 1 via wireless gateway 35. Lastly, wireless personal digital assistant 38 is preferably a handheld device which also has the ability to send and receive e-mail messages over connection 1 via wireless gateway 35.

As described in more detail below, the present invention allows remote computer 20, wireless telephone 36, wireless e-mail device 37, and wireless personal digital assistant 38 to access and control local computer 10 through the use of e-mail messages.

Figure 2:
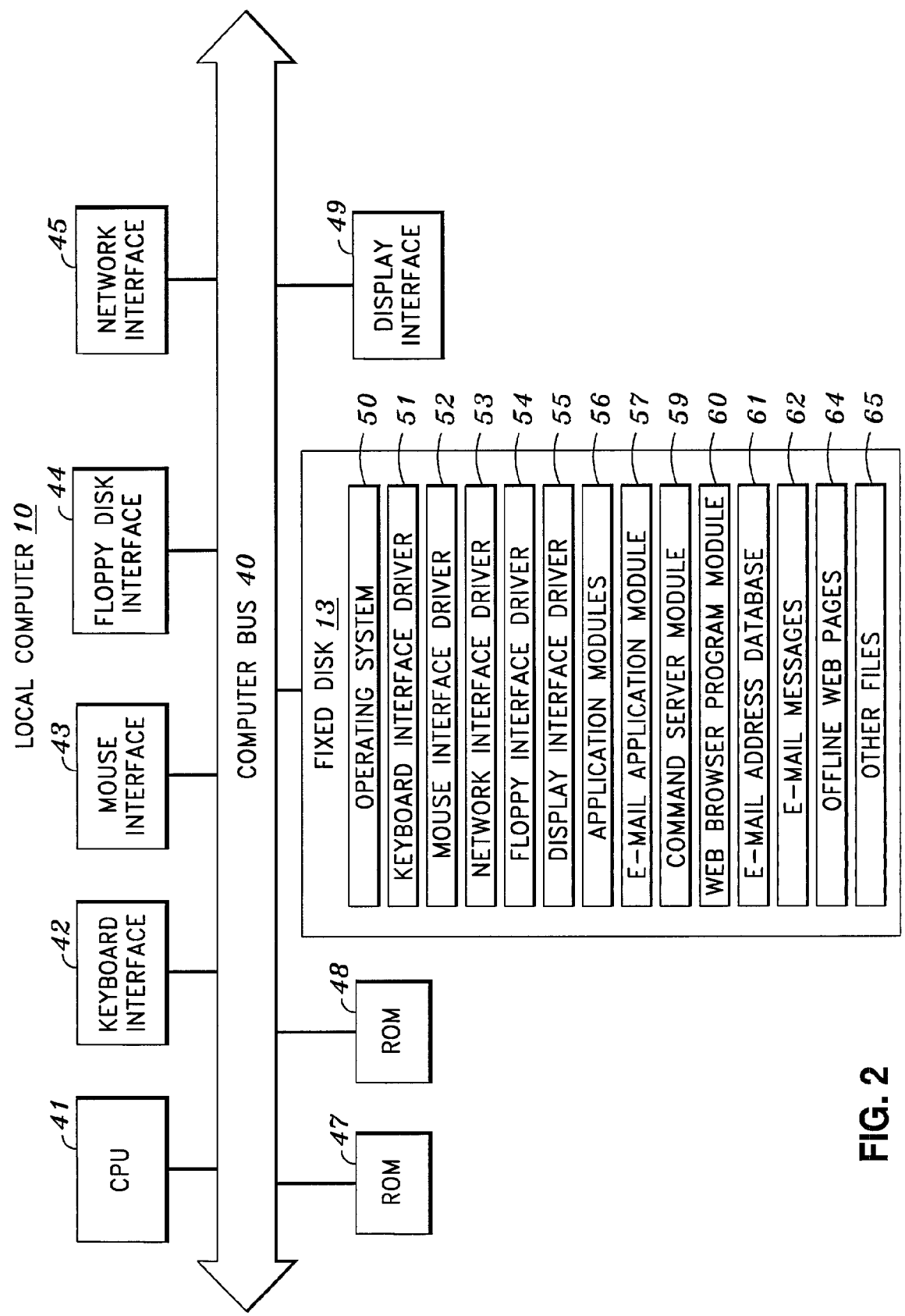
FIG. 2 is a detailed block diagram showing the internal architecture of the local computer shown in FIG. 1.

FIG. 2 is a block diagram showing an overview of the internal architecture of local computer 10. In FIG. 2, local computer 10 is seen to include central processing unit (CPU) 41 such as a programmable microprocessor which is interfaced to computer bus 40. Also coupled to computer bus 40 are keyboard interface 42 for interfacing to keyboard 15, mouse interface 43 for interfacing to mouse 14, floppy disk interface 44 for interfacing to floppy disk drive 16, network interface 45 for interfacing to server 30 via a network connection, random access memory (RAM) 47, read only memory (ROM) 48, fixed disk 13, and display interface 49 for interfacing to display 11.

Random access memory (RAM) 47 interfaces to computer bus 40 to provide central processing unit (CPU) 41 with access to memory storage, thereby acting as the main run-time memory for CPU 41. In particular, when executing stored program instruction sequences, CPU 41 loads those instruction sequences from fixed disk 13 (or other memory media) into RAM 47 and executes those stored program instruction sequences out of RAM 47. It should also be noted that standard-disk swapping techniques available under windowing operating systems allow segments of memory to be swapped to and from RAM 47 and fixed disk 13. Read-only memory (ROM) 48 stores invariant instruction sequences, such as start-up instruction sequences for CPU 41 or basic input/output operating system ("BIOS") sequences for the operation of peripheral devices attached to local computer 10.

Fixed disk 13 is one example of a computer-readable medium that stores program instruction sequences executable by CPU 41 so as to constitute operating system 50, keyboard interface driver 51 for driving keyboard interface 42, mouse interface driver 52 for driving mouse interface 43, network interface driver 53 for driving network interface 45, floppy disk interface driver 54 for driving floppy disk interface 44, and display interface driver 55 for driving display interface 49. Operating system 50 is preferably a windowing operating system, such as Windows 95, Windows 98, Windows 2000, Windows ME and Windows NT, although other types of operating systems such as DOS, UNIX and LINUX may be used with the present invention.

Fixed disk 13 also comprises application modules 56, e-mail application module 57, command server module 59, web browser program module 60, e-mail address database 61, e-mail messages 62, offline web pages 64, and other files 65. Applications modules 56 consists of various application programs for execution by CPU 41 of local computer 10 and may include any type of known application, such as word processing applications, finance applications, games, etc. E-mail application module 57 is a typical e-mail application which allows local computer 10 to access and obtain e-mail messages directed to a particular e-mail address, and to send e-mail messages, via an e-mail server. In this case, server 30 acts as an ISP for local computer 10 and is also an e-mail server for e-mail application module 57 of local computer 10. Command server module 59 is a software module which implements the functionality of the present invention to allow remote access to local computer 10, and is discussed in more detail below. Web browser program module 60 is a typical browser program which accesses and displays web pages from the internet connection, in this case through connection 1 via ISP server 30. E-mail address database 61 is a database of e-mail addresses which are allowed to remotely access local computer 10 according to one embodiment of the present invention, as discussed in more detail below.

E-mail messages 62 is comprised of e-mail messages which have been downloaded to local computer 10 via e-mail application module 57, discussed above. Offline web pages is comprised of web pages which have been accessed via web browser program module 60 and have been stored locally on fixed disk 13 of local computer 10. Lastly, other files 65 is comprised of other programs and files which may be necessary to operate local computer 10, or which are utilized by a user of local computer 10.

Figure 3:
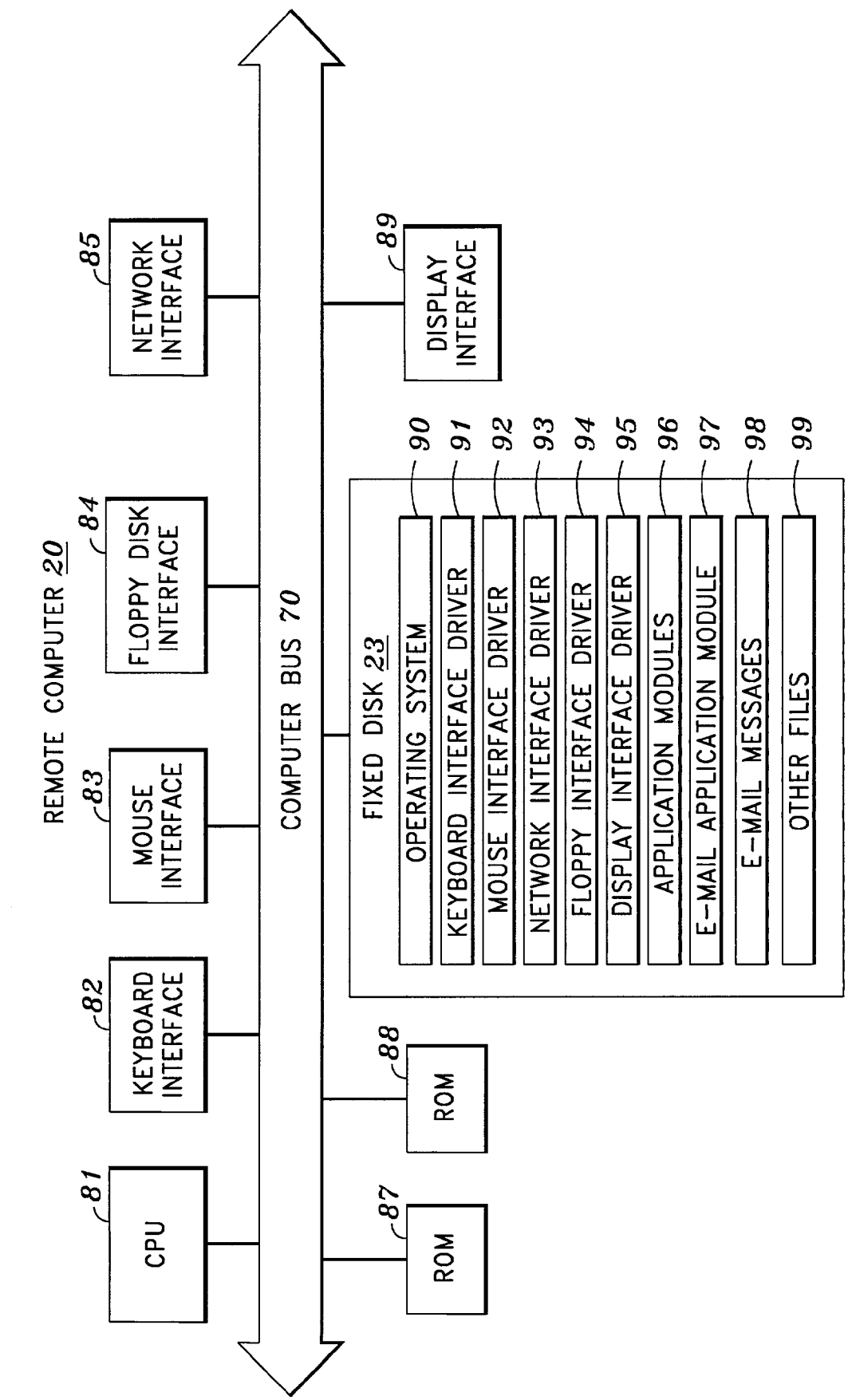
FIG. 3 is a detailed block diagram showing the internal architecture of the remote computer shown in FIG. 1.

FIG. 3 depicts the internal architecture of remote computer 20. In FIG. 3, remote computer 20 is seen to be similar to local computer 10 and includes CPU 81 which is interfaced to computer bus 70, as well as keyboard interface 82, mouse interface 83, floppy disk interface 84, network interface 85, RAM 87, ROM 88, fixed disk 23, and display interface 89. These components are similar to those of local computer 10 and are therefore not described in further detail. In addition, fixed disk 23 of remote computer 20 is seen to comprise operating system 90, keyboard interface driver 91, mouse interface driver 92, network interface driver 93, floppy disk interface driver 94, and display interface driver 95, all of which function similar to their counterparts described with respect to local computer 10.

Fixed disk 23 of remote computer 20 also comprises application modules 96, e-mail application module 97, e-mail messages 98, and other files 99, all of which are also similar to their counterparts described with respect to local computer 10, and are therefore not described in further detail. It is important to note that, although fixed disk 23 of remote computer 20 may contain other applications and files, they are not necessary for the implementation of the present invention. Specifically, remote computer 20 need only utilize e-mail application module 97 to access and control local computer 10 by sending e-mail messages over connection 1 via gateway 25. Although command sever module 59 is provided on fixed disk 13 of local computer 10 for implementing the invention, this module is not necessary on fixed disk 23 of remote computer 20. The access and control of local computer 10 by remote computer 20 will be discussed in more detail below.

Figure 4:
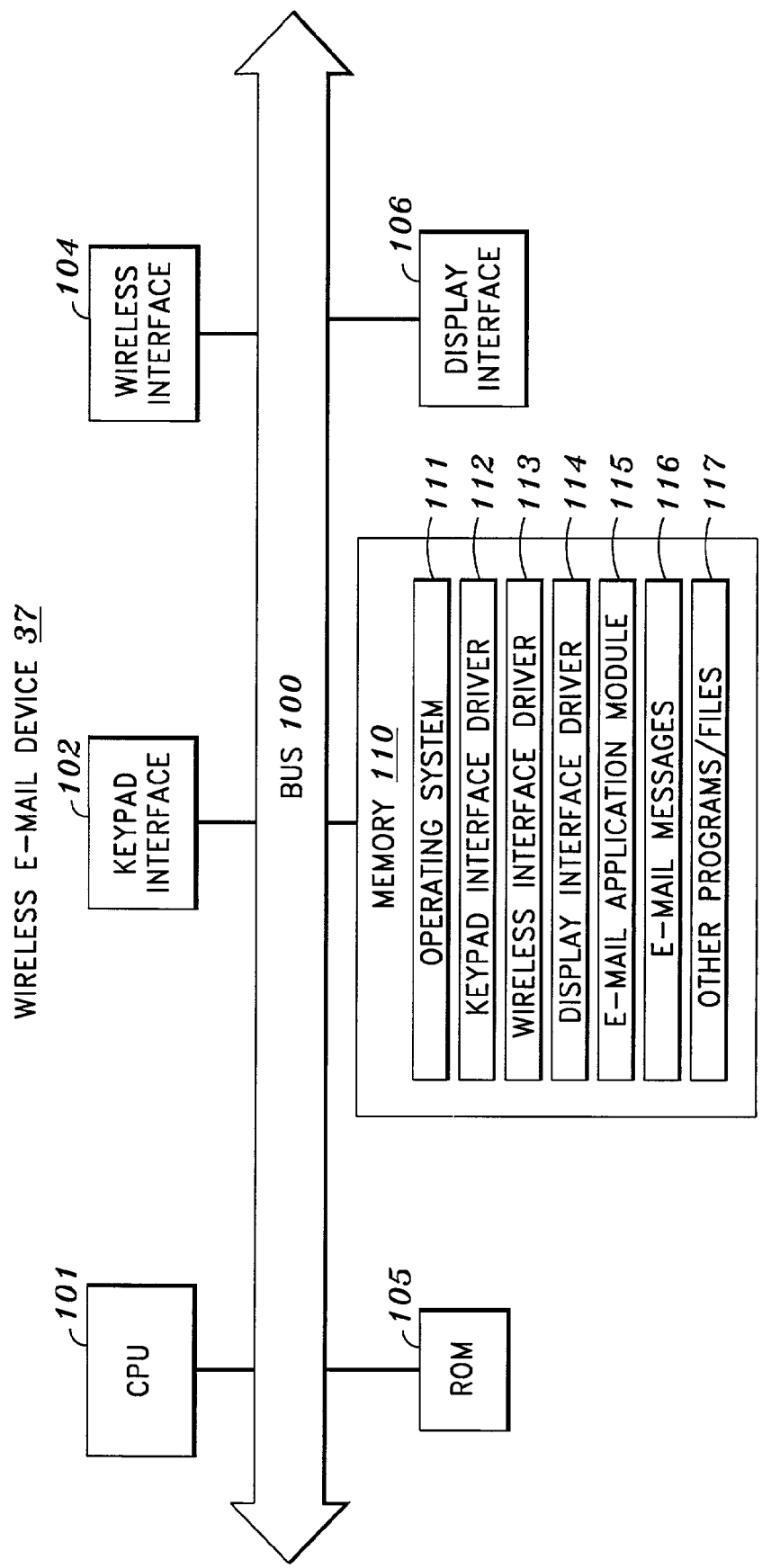
FIG. 4 is a detailed block diagram showing the internal architecture of the remote wireless e-mail device shown in FIG. 1.

Turning to FIG. 4, the internal architecture of wireless e-mail device 37 is shown. As discussed above, wireless e-mail device 37 is preferably a digital paging device with e-mail functionality implemented therein. As seen in FIG. 4, wireless e-mail device 37 is a more basic device than local computer 10 and remote computer 20, and includes CPU 101 which is interfaced to bus 100, as well as keypad interface 102 for interfacing to a keypad on wireless e-mail device 37, wireless interface 104 for allowing wireless e-mail device 37 to communicate with wireless gateway 35, RAM 105, memory 110, and display interface 106 for interfacing to a display on wireless e-mail device 37. CPU 101, RAM 105 and bus 100 operate in a similar fashion to their counterparts in local computer 10 and are therefore not described in further detail.

Memory 110 can be a read only memory (ROM) or another type of memory medium, and comprises operating system 111, keypad interface driver 112, wireless interface driver 113, display interface driver 114, e-mail application module 115, e-mail messages 116, and other programs/files 117, all of which are also similar to their counterparts described with respect to local computer 10 and remote computer 20, except that operating system 111 is preferably not a windowing operating system but is a basic operating system for maintaining operation of wireless e-mail device 37. Accordingly, the components of memory 110 are not described in further detail. Similar to remote computer 20, it is important to note that, although memory 110 of wireless e-mail device 37 may contain other applications and files, they are not necessary for the implementation of the present invention. Specifically, wireless e-mail device 37 need only utilize e-mail application module 115 to access and control local computer 10 by sending e-mail messages over connection 1 via digital gateway 35. This functionality for accessing and controlling local computer 10 by wireless e-mail device 37 is discussed in more detail below.

The internal architecture of wireless telephone 36 and wireless personal digital assistant 38 shown in FIG. 1 are not described herein because they are typical such devices. The only important feature to note with regard to these devices, is that similar to remote computer 20 and wireless e-mail device 37, wireless telephone 36 and wireless personal digital assistant 38 have an e-mail application functionality in order to access and control local computer 10 according to the present invention.

Figure 5:
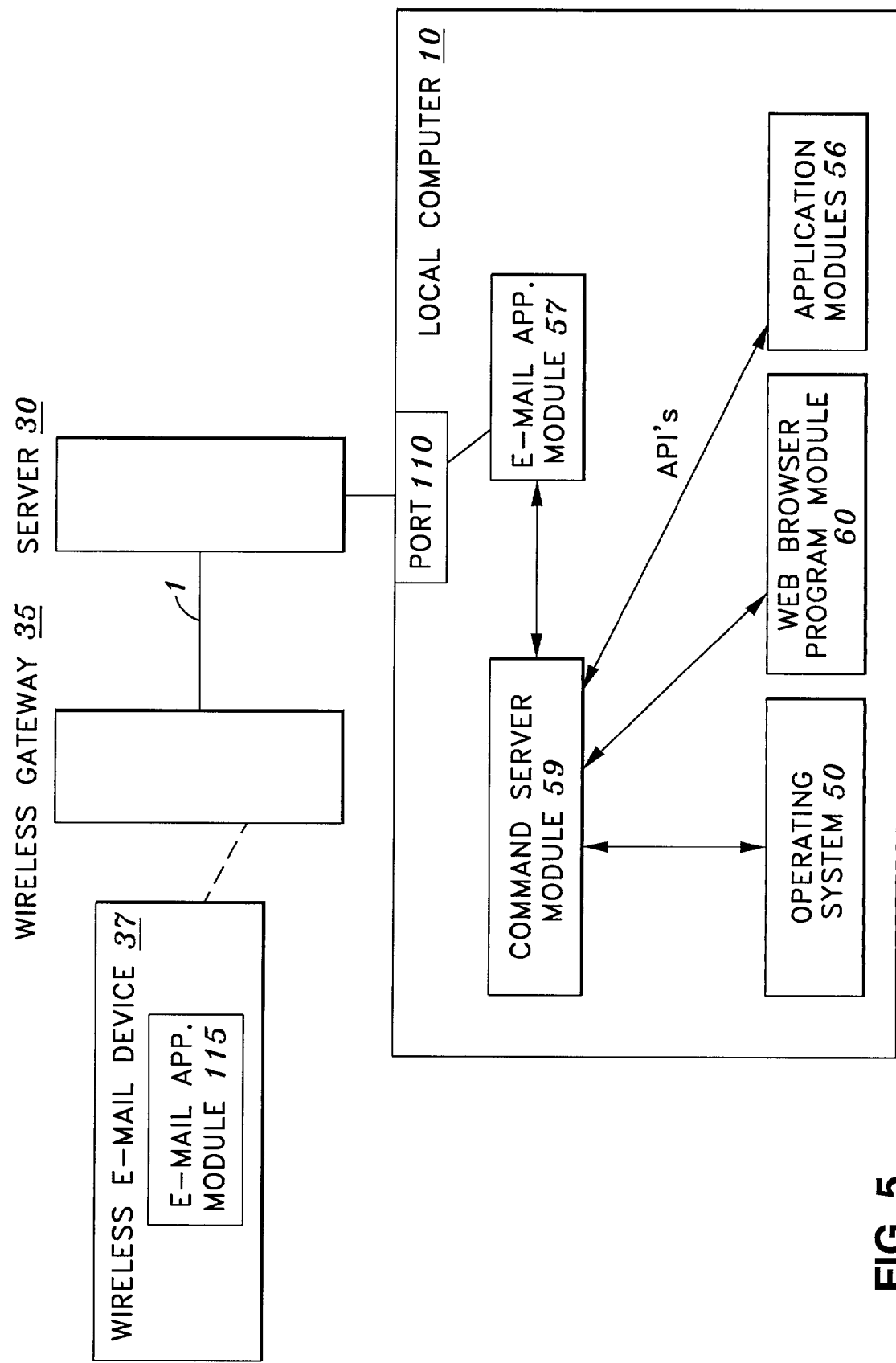
FIG. 5 is a block diagram for explaining the functionality of the command server module according to one embodiment of the present invention.

FIG. 5 is a block diagram for explaining how command server module 59 implements the functionality of the present invention according to one embodiment of the present invention. As seen in FIG. 5, wireless e-mail device 37 can send e-mail messages to local computer 10 through wireless gateway 35, connection 1, and server 30, upon which the e-mail messages are received during execution of e-mail application program module 57 of local computer 10. As mentioned above, the present invention relies upon the sending of e-mail messages from a remote device to local computer 10 in order to access and control functional capabilities of local computer 10. Specifically, a user of wireless e-mail device 37 prepares an e-mail which is addressed to an e-mail address corresponding to local computer 10, and which contains a command for local computer 10 to perform a particular function. Upon the instruction of the user, the e-mail is sent from wireless e-mail device 37 to wireless gateway 35 which routes the e-mail message over connection 1 to server 30, which acts as the ISP for local computer 10. The next time that e-mail application program module 57 of local computer 10 executes and requests receipt of new messages, the e-mail message is sent from server 30 to local computer 10. As seen in FIG. 5, port 110 of local computer 10 is used by e-mail application program module 57 to send and receive e-mail messages. In this manner, remote devices can send commands within e-mails to local computer 10 through port 110 regardless of the presence of firewalls, such as one in server 30, because firewalls do not prevent communications through port 110 which is typically reserved for e-mail access.

Command server module 59 executes in local computer 10 and frequently monitors e-mail application module 57 to detect the receipt of new e-mail messages. In this regard, command server module 59 interacts with e-mail application module 57 through function calls which are preferably known standardized application program interface calls that are supported by operating system 50. When command server module 59 detects that e-mail application module 57 has received an e-mail message with a command indicator (CMD:) in the subject line of the e-mail message, command sever module 59 retrieves the e-mail message and parses it to extract the command from the e-mail message. The command may be placed immediately after the command indicator in the subject line of the e-mail message, or may be placed in the body portion of the e-mail message. Command server module 59 is designed to process a given set of predetermined commands and therefore parses the e-mail to search for one of the predetermined commands.

For example, a command placed in the subject line of the e-mail message may be an operating system "directory" command which requests a listing of the contents of a particular directory of fixed disk 13. Command server module 59 extracts the command from the e-mail message and then selects a function call to execute the command, based on which type of predetermined command has been extracted. In the preceding example, command server module 59 uses an operating system function call to have operating system 50 execute the "directory" command. In a similar manner, command server module 59 also processes predetermined commands that are executed by one or more of application modules 56, by e-mail application module 57, or web browser program module 60. In each case, command server module 59 utilizes an appropriate function call for the application which corresponds to the command extracted from the e-mail. In this manner, a user of wireless e-mail device 37 can use e-mail messages to access the functionality of operating system 50, application modules 56, e-mail application module 57, and web browser program module 60.

Upon execution of the extracted command in response to the function call initiated by command server module 59, resulting output data is returned to command server module 59 via the function call. Command server module 59 then generates an output e-mail message directed to the originating e-mail address of wireless e-mail device 37. The resulting output data is placed in the body of the output e-mail message, and the output e-mail message is then passed to e-mail application module 57 via a function call which instructs e-mail application module 57 to send the output e-mail message to the originating e-mail address. The output e-mail message is then sent from local computer 10 to wireless gateway 35 via server 30 and connection 1. Wireless gateway 35 then sends the output e-mail message to wireless e-mail device 37, for viewing by the user of wireless e-mail device 37. In this manner, the user can retrieve the resulting data from execution of the user's desired command in local computer 10.

In this manner, the present invention provides a user of wireless e-mail device 37 with the capability to access local computer 10 in order to remotely check or redirect e-mail from local computer 10, to remotely execute operating system commands in local computer 10, to access web pages and receive the text content thereof via local computer 10, and to access functionality of other applications in local computer 10 and then retrieve the results. In each case, the results are returned to the user of wireless e-mail device 37 in text format within the body of an output e-mail message. Of course it should be appreciated that command server module 59 can be used to support other predetermined commands for accessing other functions and applications of local computer 10.

Figure 6:
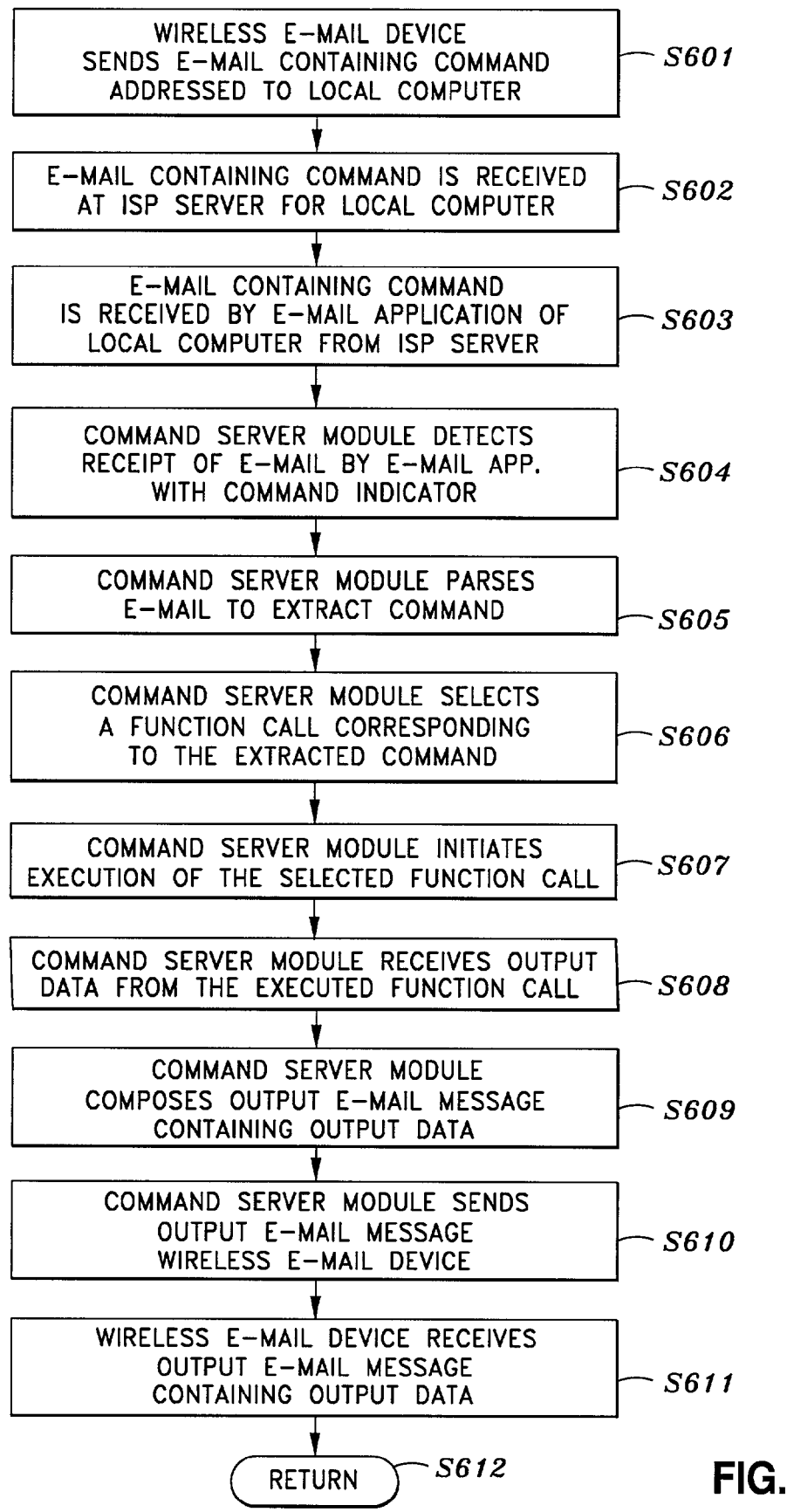
FIG. 6 is a flowchart for explaining remote access and control of the local computer by a remote device according to one embodiment of the present invention.

FIG. 6 is a flowchart for explaining the functionality of the present invention. In step S601, wireless e-mail device 37 sends an e-mail message which is addressed to an e-mail address which corresponds to local computer 10. The e-mail message contains a command indicator in the subject line and contains a command which is located either immediately after the command indicator in the subject line or in the body portion of the e-mail message. In step S602, the e-mail message is received at server 30, which is the ISP server for local computer 10. In this regard, the e-mail message is received at server 30 from connection 1 via wireless gateway 35.

Next, the e-mail message is received from server 30 by e-mail application module 57 which is executing in local computer 10 (step S603). Preferably, the e-mail message is received in response to a request from e-mail application module 57 to server 30 for new e-mail messages. Command server module 59 is executing in local computer 10 and periodically polls e-mail application module 57 for the presence of new e-mail messages with a command indicator, such as CMD:, in the subject line. As discussed above, command server module 59 preferably communicates with e-mail application module 57 through the use of application program interface function calls which are supported by operating system 50. In step S604, command server module 59 detects that e-mail application module 57 has received the e-mail message which has a command indicator in its subject line. Command server module 59 then parses the received e-mail message to extract the command (step S605).

Once the command has been extracted from the received e-mail message, command server module 59 determines the type of command and then selects a function call which corresponds to the type of command in order to execute the functionality required by the command (step S606). For example, if the extracted command is a DIR command which requests the contents of a desired directory of fixed disk 13 of local computer 10, then command server module 59 determines that the extracted command is an operating system command and then selects an operating system function call to execute the DIR command. In step S607, command server module 59 then initiates execution of the selected function call. In the foregoing example, command server module 59 sends a DIR function call to the operating system which then executes the DIR command in a DOS window to retrieve a listing of the contents of the desired directory of fixed disk 13. Preferably, the function call pipes the output from the DIR command to a temporary file for access by command server module 59.

Next, the output data, in this case the directory listing, is received by command server module 59 in response to execution of the selected function call (step S608). Of course it can be appreciated that the output data is retrieved from whichever application which supports the selected function call corresponding to the extracted command. For example, if the extracted command is instead a request for a web page, then command server module 59 selects a function call to web browser program module 60 to retrieve the web page corresponding to the web address provided in the extracted command. The output data in such an example would consist of the web page content, which is then returned to command server module 59 via the selected function call. In step S609, command server module 59 composes an output e-mail message which is addressed to wireless e-mail device 37 and which contains the output data returned from execution of the selected function call. As an alternative, the output e-mail message could be directed to a different e-mail address according to an instruction provided in a parameter of the extracted command. For example, a user of wireless e-mail device 37 could request that local computer 10 retrieve the content of a particular web page and then send the retrieved content to another user's e-mail address.

Command server module 59 then sends the output e-mail message to wireless e-mail device 37 via server 30, connection 1, and wireless gateway 35 (step S610). In step S611, wireless e-mail device 37 receives the output e-mail message containing the output data for viewing by the user of wireless e-mail device 37. Flow then passes to return in step S612. In this manner, a user of a remote computing device, such as wireless e-mail device 59, can use conventional e-mail to access and control functionality of local computer 10, including the operating system, e-mail application, web browser, or other applications of local computer 10.

Figure 7:
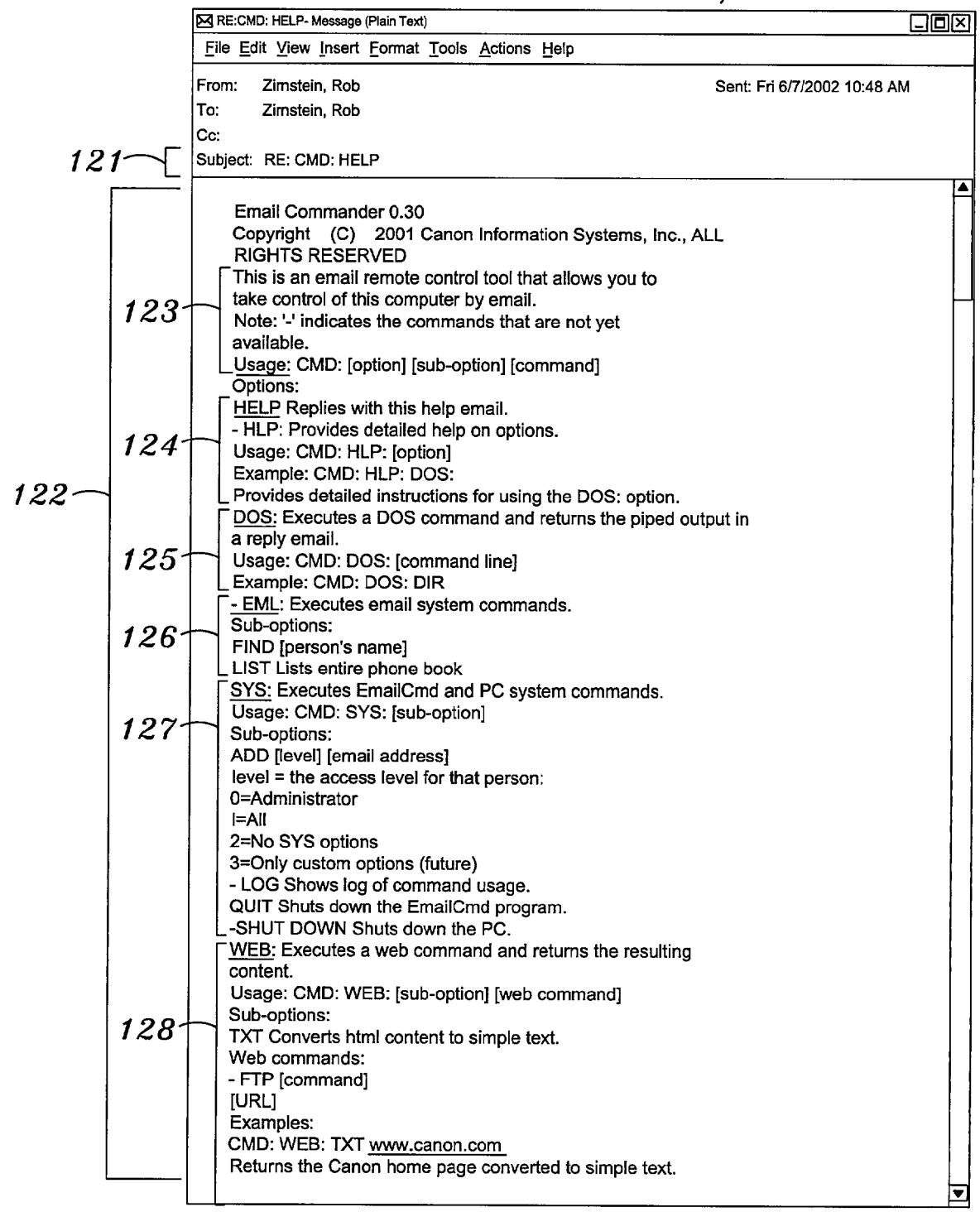
FIG. 7 is an illustrated example of a return e-mail message in response to a help command which was sent from a remote device to the local computer according to one embodiment of the present invention.

FIG. 7 is an illustration of an output e-mail message which is returned to the remote computing device in response to a "help" command which was sent to local computer 10. In particular, as can be seen in subject line 121 of e-mail message 120 in FIG. 7, the initial e-mail sent to local computer 10 had the command indicator "CMD:" in the subject line, followed by the "HELP" command. Accordingly, command server module 59 detected the e-mail containing the "HELP" command, as described above, and selected a function call which obtains help-related text information from a memory location. The help-related text information explains how to use the predetermined commands which are supported by command server module 59 according to the present invention. Command server module 59 then prepared output e-mail message 120 which contains the help-related text information and sent output e-mail message 120 to the requesting remote device.

As seen in FIG. 7, body 122 of e-mail message 120 contains text information which explains how to use the predetermined commands supported by command server module 59, and a description of each predetermined command. Syntax usage section 123 describes how to specify a predetermined command in the subject line of an e-mail addressed to local computer 10, along with options, suboptions and command parameters. HELP command section 124 describes how to use the HELP command to obtain information about all predetermined commands, or about an individual specified predetermined command. DOS command section 125 describes how to use the DOS command to have operating system 50 of local computer 10 perform a DOS function, such as the DIR function described above. E-MAIL command section 126 describes how to use the EML command to obtain information from e-mail application module 57, such as to FIND e-mail information from the e-mail application address book for a specific person, or to LIST the contents of the entire e-mail application address book.

SYSTEM command section 127 describes how to use the SYS command to monitor and control the functionality of the present invention through command server module 59, and to control the operation of local computer 10. Specifically, a user may utilize the SYS command to add e-mail addresses of users who are allowed to use the predetermined commands supported by command server module 59 to access local computer 10, and to set the level of access for each user. This function is discussed in more detail below. A user can also use the SYS command to show a log of command usage through command server module 59, and to quit command server module 59 so that users cannot access local computer 10 through a command in an e-mail message. The SYS command can also be used to SHUT DOWN local computer 10.

Lastly, WEB command section 128 of e-mail message 120 describes how to use the WEB command to have web browser program module 60 access a specified web address and then return the content of the web page corresponding to that specified web address. As a suboption, a user can request that the html portion of the specified web page be converted to simple text before being returned to the requesting user. In this manner, a user of a remote computing device with limited resources, such as a digital e-mail enabled paging device, can receive the return output e-mail message with the text content of a specified web page.

Turning to FIG. 8, an illustration is provided of an output e-mail message which is returned to the remote computing device in response to a "DOS: DIR" command which was sent to local computer 10. In particular, as can be seen in subject line 131 of e-mail message 130 in FIG. 8, the initial e-mail sent to local computer 10 had the command indicator "CMD:" in the subject line, followed by the "DOS" command and the "DIR" command option. Accordingly, command server module 59 detected the e-mail containing the "DOS" command, as described above, and selected a function call to operating system 50 which then executed the DIR command and output a listing of the contents of the present directory of fixed disk 13 in local computer 10. Command server module 59 then prepared output e-mail message 130 containing the output directory listing and sent output e-mail message 130 to the requesting remote device. In this manner, a user of a remote computing device can remotely obtain information of fixed disk 13 on local computer 10.

FIG. 9 provides an illustration of an output e-mail message which is returned to the remote computing device in response to a "WEB" command which was sent to local computer 10. In particular, as can be seen in subject line 141 of e-mail message 140 in FIG. 9, the initial e-mail sent to local computer 10 had the command indicator "CMD:" in the subject line, followed by the "WEB" command and a URL address of a specific web page. Accordingly, command server module 59 detected the e-mail containing the "WEB" command, and selected a function call to web browser program module 60 which then executed the WEB command and returned the corresponding web page information to command server module 59. Command server module 59 then prepared output e-mail message 140 containing the web page information in message body 142, and sent output e-mail message 140 to the requesting remote device. In this manner, a user of a remote computing device can remotely obtain web page information via local computer 10. As seen in FIG. 9, the web page information is the raw HTML code with text information included therein. Of course, some more recent e-mail programs include the capability to support HTML, and therefore the web page can be graphically represented directly in e-mail message 140. However, if the web page information is requested by a remote computing device of limited resources, such as wireless e-mail device 37, then it is preferable to have only the raw HTML code and text information included in e-mail message 140.

Figure 10:
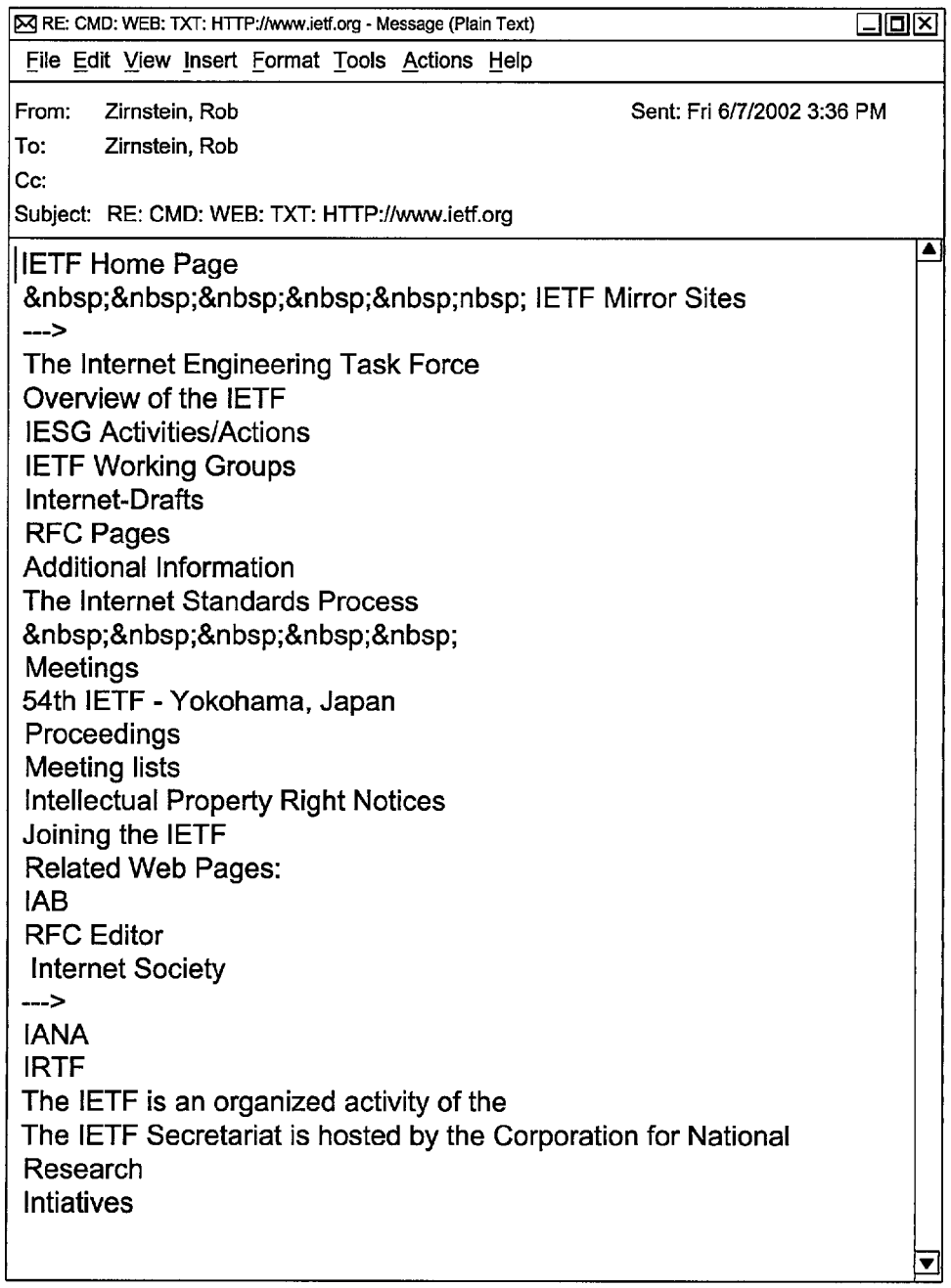
FIG. 10 is an illustrated example of a return e-mail message in response to a web page text request command which was sent from a remote device to the local computer according to one embodiment of the present invention.

In this regard, FIG. 10 provides an illustration of an output e20 mail message which is returned to the remote computing device in response to a "WEB" command which was sent to local computer 10, including the option to return only the web page text information. In particular, as can be seen in subject line 151 of e-mail message 150 in FIG. 10, the initial e-mail sent to local computer 10 had the command indicator "CMD:" in the subject line, followed by the "WEB" command, the option "TXT", and then a URL address of a specific web page. Accordingly, command server module 59 detected the e-mail containing the "WEB" command and "TXT" option, and selected a function call to web browser program module 60 which then executed the WEB command and returned the corresponding web page information to command server module 59. Command server module 59 parsed the web page information to remove all HTML code so as to leave only the text information. Command sever module 59 then prepared output e-mail message 150 containing the web page text information in message body 152, and sent output e-mail message 150 to the requesting remote device. In this manner, a user of a remote computing device can remotely obtain only the text information of a web page via local computer 10. As seen in FIG. 10, the web page text information located in message body 152 is much easier to read without the presence of the raw HTML code included.

The above description of the present invention describes how a user can remotely access local computer 10 to perform certain functions through the use of commands contained in e-mail messages sent to local computer 10. It can be appreciated that the owner and/or user of local computer 10 may not want the functionality of local computer 10 to be accessible to any user with e-mail capability. Accordingly, a second embodiment of the invention includes functionality within command server module 59 for limiting access to local computer 10 to only certain specified users, and for limiting the level of access for each allowed user. In this regard, the second embodiment includes the use of e-mail address database 61 which lists the e-mail addresses of users that are allowed to access local computer 10 through command server module 59.

As seen in FIG. 11, the structure and content of e-mail address database 61 is depicted. In general, e-mail address database 61 is simply a mechanism to maintain the e-mail addresses of those users who are allowed access to local computer 10, and the level of access for each of the allowed users. In this manner, when a received e-mail is detected by command server module 59 which contains a command indicator, the e-mail address from which the received e-mail was sent is parsed from the received e-mail and compared to the entries in e-mail address database 61. If the sender's e-mail address is listed in e-mail address database 61 as having access not allowed, then command server module 59 takes appropriate action to prevent access to local computer 10 through e-mails from that e-mail address. If, in the alternative, the sender's e-mail address is listed in e-mail address database 61 as having access allowed, then command server module 59 inspects the access level corresponding to that e-mail address and only allows access to local computer 10 in accordance with the corresponding access level.

Returning to FIG. 11, e-mail address database 61 includes columns for e-mail address 160, access allowed 161 and access level 162. Email address 160 is the e-mail address for each entry, and access allowed 161 indicates whether or not commands in e-mails from the e-mail address for that entry should be processed by command server module 59. Access level 162 indicates what types of commands should be processed for e-mails from the e-mail address for that entry. As described in SYSTEM command section 127 in FIG. 7, there are four access levels, 0 through 4, with level 0 corresponding to full administrative access to local computer 10. A user with administrative access can utilize all predetermined commands supported by command server module 59, including the system commands to add new e-mail addresses to e-mail address database 61, or to change the access level of e-mail addresses in e-mail address database 61. The other levels provide decreasing levels of access to the predetermined commands.

For example, entry 164 of e-mail address database 61 contains the e-mail address of zirnstein@email.com and gives that user access with an administrative access level of 0. Entry 165 of e-mail address database 61 contains the e-mail address of friend1@email.com and gives that user access with an access level of 1 for all predetermined commands, because friend1 is a trusted user. Entry 166 of e-mail address database 61 contains the e-mail address of snoopy@email.com and gives that user access with an access level of 2 for all predetermined commands except system commands, because snoopy is not necessarily a trusted user. Entry 167 of e-mail address database 61 contains the e-mail address of friend2@email.com and gives that user access with an access level of 3 for only a custom set of the predetermined commands, because friend2 has only a limited need for access to local computer 10, such as to obtain web page information. Lastly, Entry 169 of e-mail address database 61 contains the e-mail address of hacker@email.com and does not give that user any access to local computer 10, because hacker is known to misuse and corrupt other users' computer resources. Of course, the last entry is not necessary, because if a user's e-mail is not listed in e-mail address database 61, that user will not be given access to local computer 10. However, it may be beneficial to also maintain a list of user's who are currently barred from accessing local computer 10, but who may be allowed access in the future.

Figure 12:
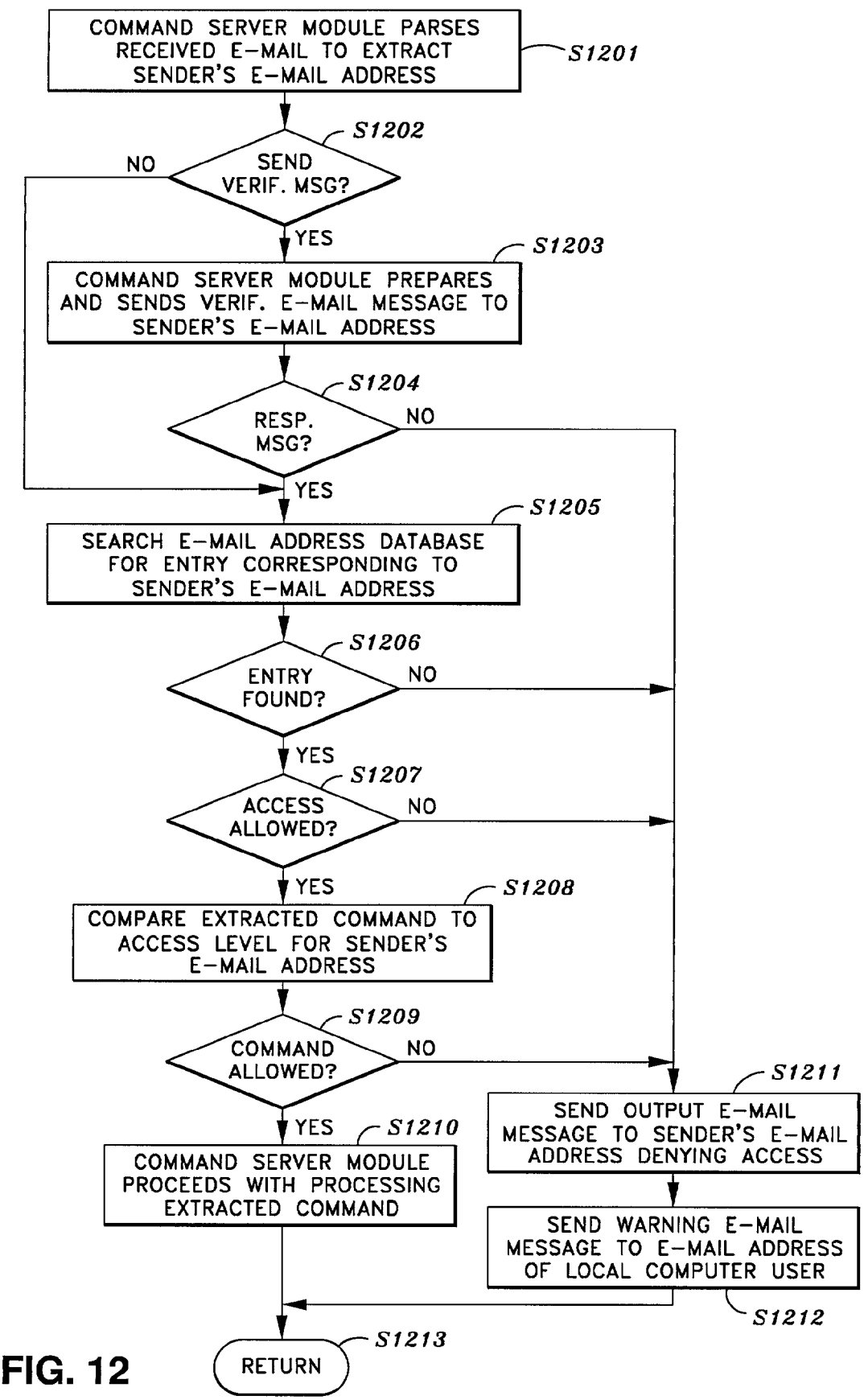
FIG. 12 is a flowchart for explaining the use of the e-mail address database shown in FIG. 11 for controlling access to the local computer by a remote device according to a second embodiment of the present invention.

FIG. 12 is a flowchart which explains the functionality of the security measures provided in the second embodiment of the invention using e-mail address database 61. In the second embodiment, the functionality of providing remote access to local computer 10 through the use of e-mail which contains a predetermined command is the same as the first embodiment discussed above. The second embodiment also contains additional security features to prevent unwanted access to local computer 10. As seen in FIG. 12, the steps shown are performed by command server module 59 once the received e-mail containing the command has been detected and parsed to extract the command. In step S1201, command server module 59 parses the received e-mail message to obtain the sender's e-mail address. In step S1202, it is determined if a verification message is to be sent to the sender's e-mail address. This determination is made in accordance with a security setting in command server module 59 which may be set by an administrator.

If a verification message is to be sent, command server module 59 prepares a verification e-mail message which is addressed to the sender's e-mail address and which advises that access to local computer 10 is being requested and requests that the sender send a response e-mail message back to local computer 10 (step S1203). In this manner, an imposter who sends an e-mail that lists an allowed sender's e-mail address will not be successful in gaining access to local computer 10 because the verification e-mail message will be sent to the true allowed sender's e-mail address. The true allowed sender is then on notice that an imposter is attempting to access local computer 10 and can take appropriate action, such as shutting down command server module 59 or local computer 10 through system commands in e-mail messages.

If the initial received e-mail message was actually sent by the allowed sender's e-mail address, then the sender simply sends a response e-mail mail message back to local computer 10 to confirm the authenticity of the initial received e-mail message. In step S1204, command server module 59 determines if a response message was sent back to local computer 10. If not, then the authenticity of the initial received e-mail message was not confirmed and so command server module 59 sends an output e-mail message to the sender's e-mail address advising that access is denied (step S1211). In addition, a warning e-mail message is sent to an e-mail address of the user of local computer 10 advising that access to local computer 10 was attempted and denied (step S1212). The user of local computer 10 can then take appropriate action as discussed above, if desired.

If it is determined in step S1204 that a response message was sent back to local computer 10, then flow passes to step S1205 in which command server module 59 searches e-mail address database 61 for an entry corresponding to the sender's e-mail address. In step S1206, it is determined if an entry is found in e-mail address database 61 which corresponds to the sender's e-mail address. If not, flow passes to steps S1211 and S1212 in which command server module 59 sends an output e-mail message to the sender's e-mail address advising that access is denied, and also sends a warning e-mail message to an e-mail address of the user of local computer 10 advising that access to local computer 10 was attempted and denied. If an entry is found in e-mail address database 61 which corresponds to the sender's e-mail address, then it is determined in step S1207 whether e-mail address database 61 indicates that access to local computer 10 is allowed for the sender's e-mail address. If not, flow passes to steps S1211 and S1212 in which an output e-mail message is sent to the sender's e-mail address and a warning e-mail message is sent to the e-mail address of the user of local computer 10.

If e-mail address database 61 indicates that access is allowed to computer 10 for the sender's e-mail address, then the extracted command form the received e-mail message is compared to the access level corresponding to the sender's e-mail address in e-mail address database 61 (step S1208). In step S1209, it is determined if the command is allowed for the sender's e-mail address. If the access level for the sender's e-mail address does not allow the extracted command, then flow passes to steps S1211 and S1212 in which an output e-mail message is sent to the sender's e-mail address and a warning e-mail message is sent to the e-mail address of the user of local computer 10, and then flow passes to return in step S1213. If the command is allowed, then flow passes to step S1210 in which command server module 59 proceeds with processing the extracted command as explained above with respect to the flowchart of FIG. 6. Flow then passes to return in step S1213. In this manner, a command sent in an e-mail from a remote device to local computer 10 is not processed and executed unless e-mail address database 61 indicates that the sender's e-mail address is authorized to access local computer 10 and to use the command.

Figure 13:
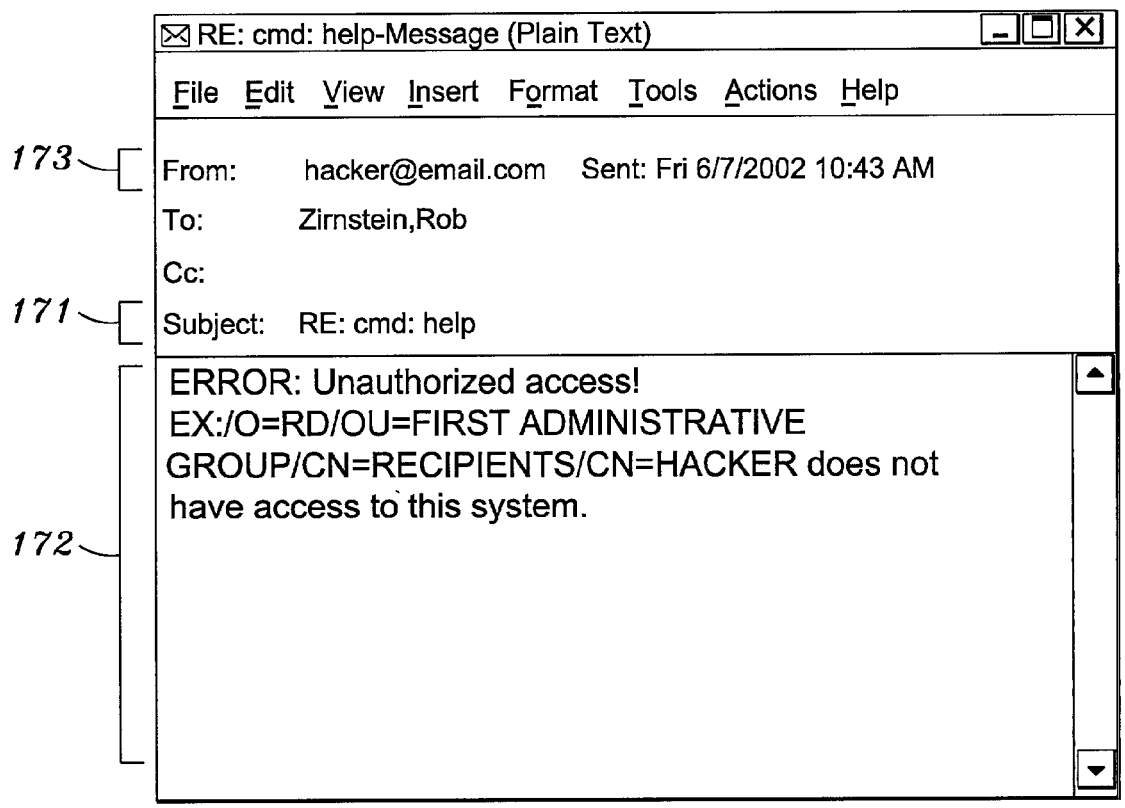
FIG. 13 is an illustrated example of a return e-mail message in response to a command which was sent from a remote device to the local computer, for which access is denied by the local computer, according to a second embodiment of the present invention.

FIG. 13 is an illustration of an output e-mail message which is sent to the sender's e-mail address to advise that access has been denied for any of the reasons discussed above with respect to FIG. 12. As seen in FIG. 13, output e-mail message 170 indicates that the original e-mail message has sender's e-mail address 173 of hacker@email.com and included the HELP command in subject line 171. As discussed earlier, e-mail address database 61 does not allow access to local computer 10 for hacker@email.com. Accordingly, body portion 172 of output e-mail message 170 includes an advisory message that access is denied for hacker@email.com.

Although e-mail address database 61 provides a mechanism for limiting access to local computer 10 through command server module 59, another embodiment of the invention uses an encryption feature now available in some e-mail applications to prevent unauthorized access to local computer 10. In this third embodiment, a remote user must have access to an encryption key in order to access local computer 10 through a command in an e-mail message. In this manner, remote user's without pre-knowledge of the correct encryption key cannot use commands in e-mail messages to access the functionality of local computer 10. In addition, this embodiment of the invention allows an authorized remote user to use a command in an e-mail which instructs local computer 10 to open a unique port for communication with a remote device.

Figure 14B:
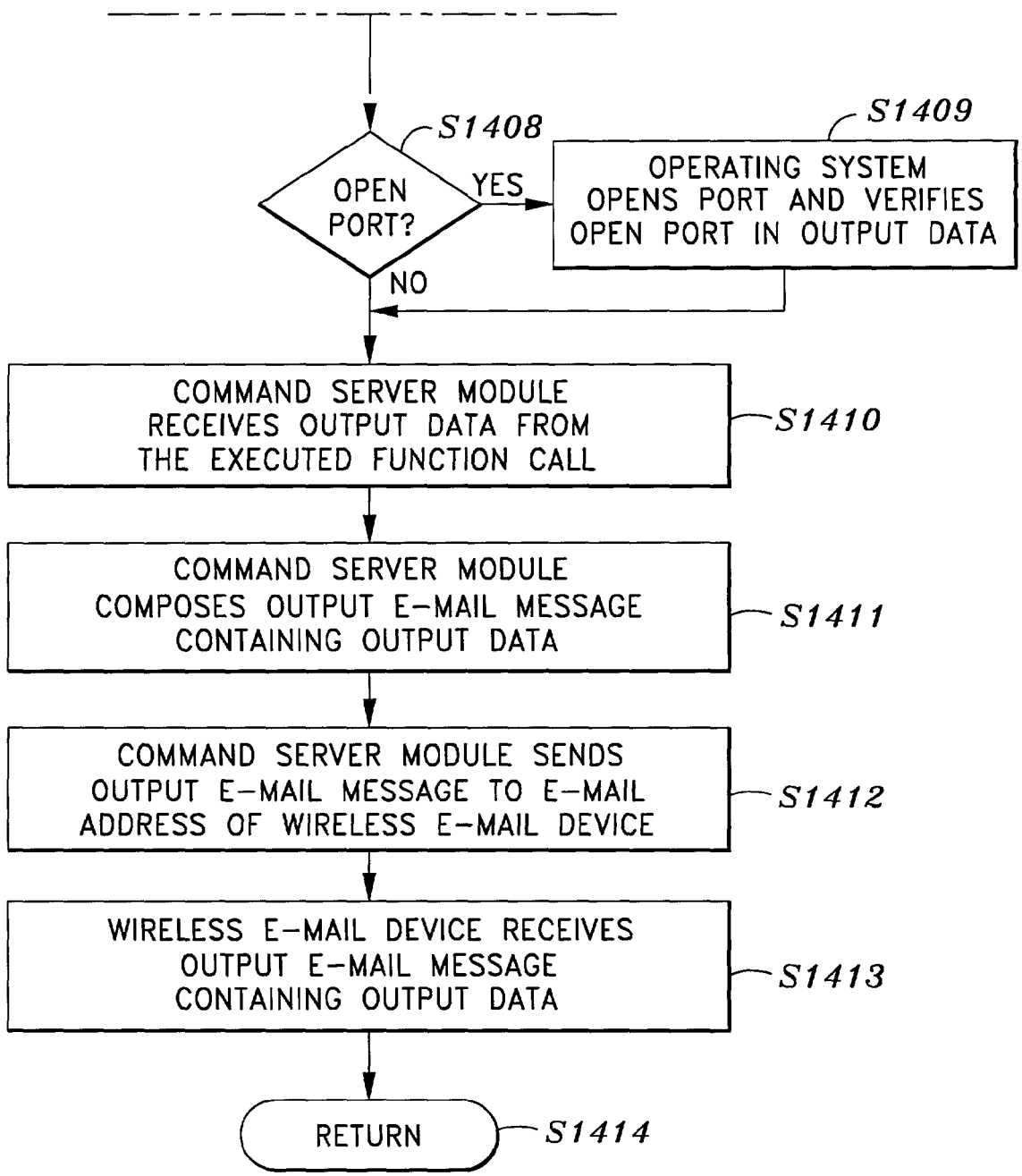
FIG. 14 is a flowchart for explaining remote access and control of the local computer by a remote device according to a third embodiment of the present invention.
Figure 2:
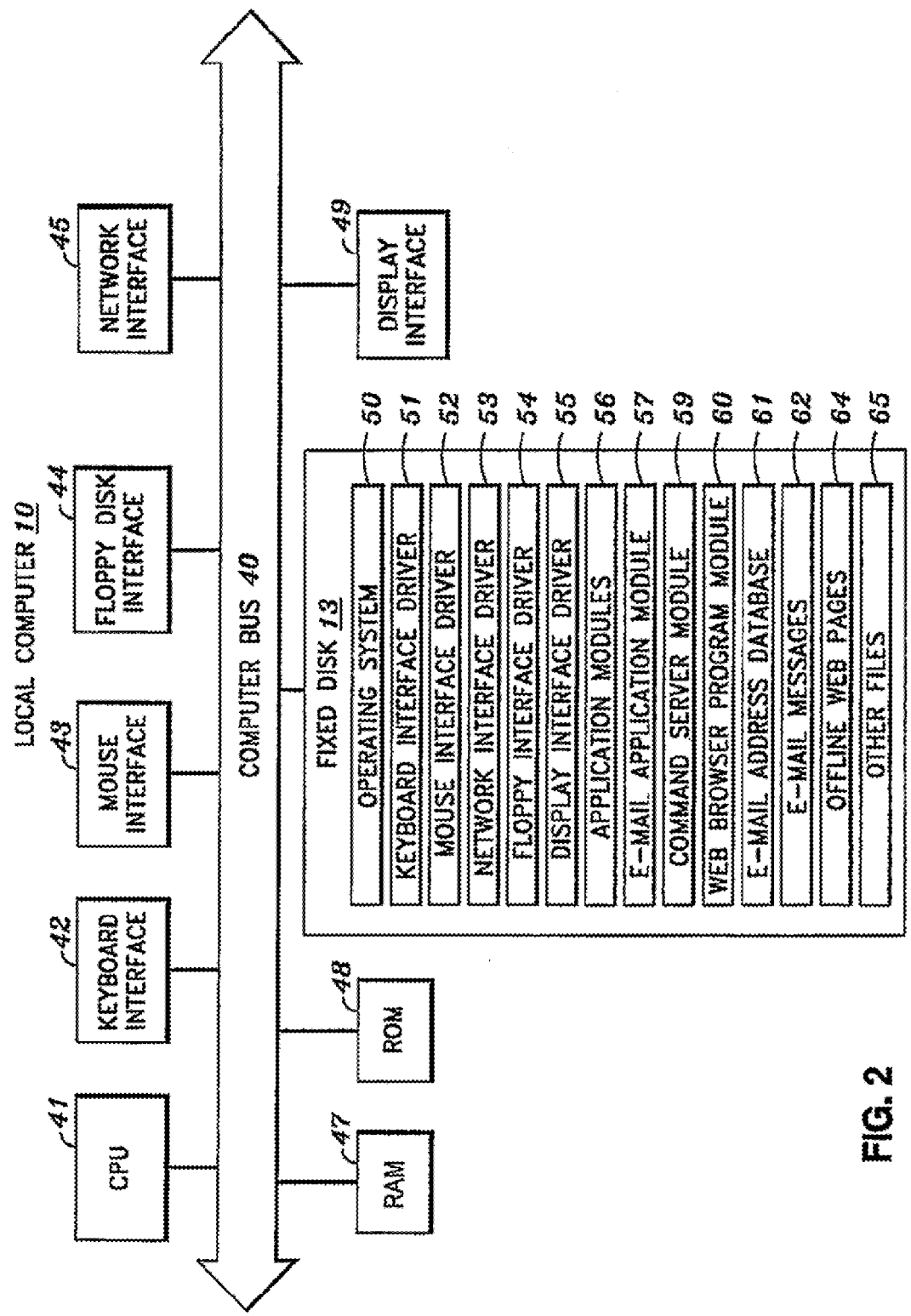
Figure 4:
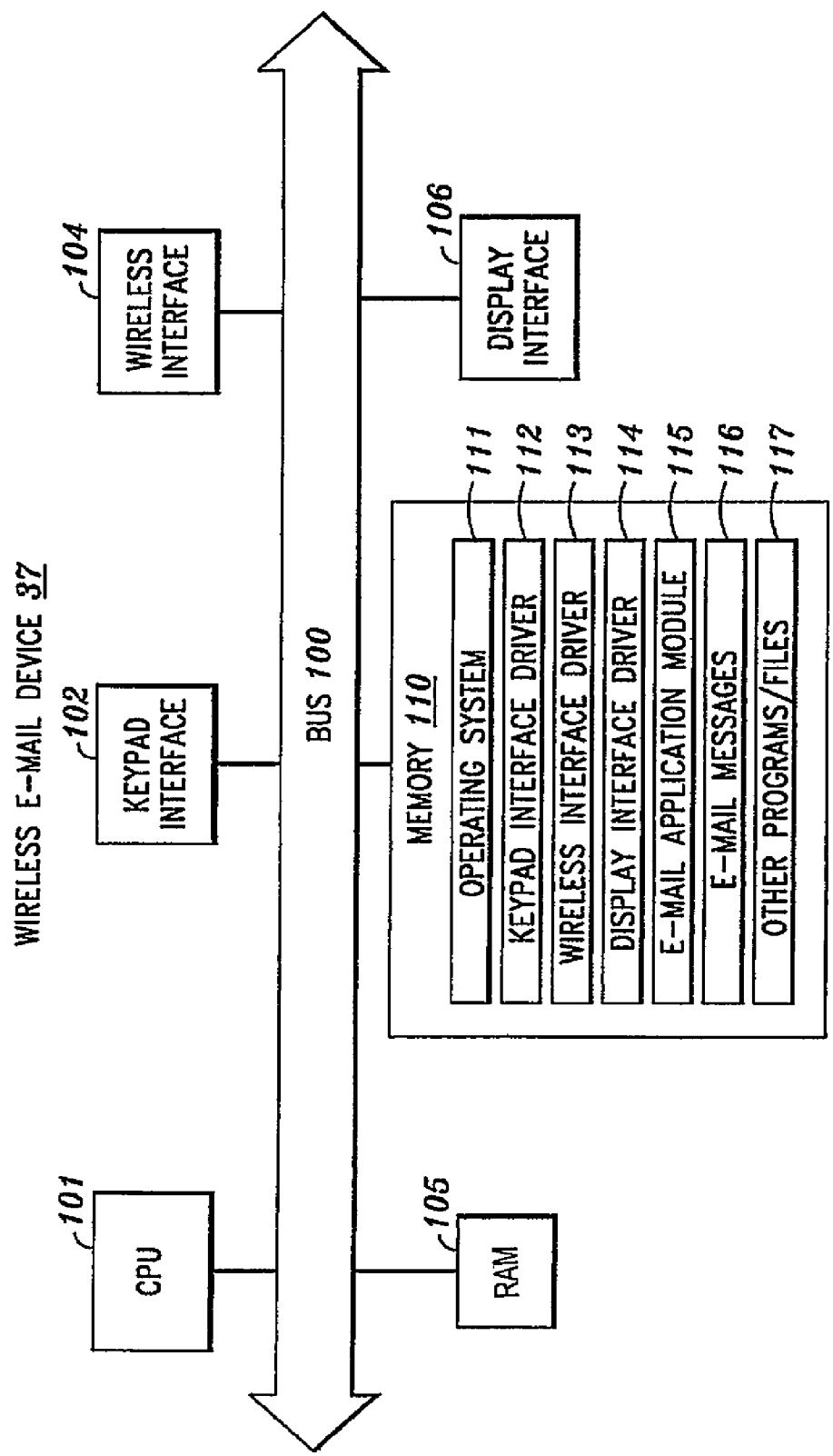

FIG. 14 provides a flowchart for explaining the functionality of the third embodiment of the present invention. In step S1401, wireless e-mail device 37 prepares an e-mail message which contains a command indicator in the subject line and which contains a command in the body portion of the e-mail message, and then encrypts the body portion but leaves the subject line clear (unencrypted). Wireless e-mail server 37 then sends the e-mail message to the e-mail address which corresponds to local computer 10. In step S1402, the e-mail message is received at server 30, which is the ISP server for local computer 10. In this regard, the e-mail message is received at server 30 from connection 1 via wireless gateway 35.

Next, the e-mail message containing the encrypted command is received from server 30 by e-mail application module 57 which is executing in local computer 10 (step S1403). Preferably, the e-mail message is received in response to a request from e-mail application module 57 to server 30 for new e-mail messages. Command server module 59 is executing in local computer 10 and periodically polls e-mail application module 57 for the presence of new e-mail messages with a command indicator, such as CMD:, in the subject line. As discussed above, command server module 59 preferably communicates with e-mail application module 57 through the use of application program interface function calls which are supported by operating system 50. In step S1404, command server module 59 detects that e-mail application module 57 has received the e-mail message which has a clear command indicator in its subject line. Command server module 59 then decrypts the body portion of the received e-mail message and parses the body portion to extract the command (step S1405). Preferably the decryption is performed with a private key unique to local computer 10.

Once the command has been extracted from the received e-mail message, command server module 59 determines the type of command and then selects a function call which corresponds to the type of command in order to execute the functionality required by the command (step S1406). For example, if the extracted command is a DIR command which requests the contents of a desired directory of fixed disk 13 of local computer 10, then command server module 59 determines that the extracted command is an operating system command and then selects an operating system function call to execute the DIR command. In step S1407, command server module 59 initiates execution of the selected function call. In the foregoing example, command server module 59 sends a DIR function call to the operating system which then executes the DIR command in a DOS window to retrieve a listing of the contents of the desired directory of fixed disk 13. Preferably, the function call pipes the output from the DIR command to a temporary file for access by command sever 59.

In step S1408, it is determined if the extracted command also requests that operating system open a new, unique port for direct communication with the requesting remote device, which in this case is wireless e-mail device 37. If it is determined that a port is requested, flow passes to step S1409 in which operating system 50 opens a new port and places a verification message that the port is open into output data which is passed back to command server module 59, and then flow passes to step S1410. If, on the other hand, it is determined that a port is not requested, flow passes directly to step S1410. In step S1410, the output data, in this case the directory listing, is received by command sever module 59 in response to execution of the selected function call. Of course it can be appreciated that the output data is retrieved from whichever application which supports the selected function call corresponding to the extracted command. For example, if the extracted command is instead a request for a web page, then command sever module 59 selects a function call to web browser program module 60 to retrieve the web page corresponding to the web address provided in the extracted command. The output data in such an example would consist of the web page content, which is then returned to command sever module 59 via the selected function call. In step S1411, command sever module 59 composes an output e-mail message which is addressed to wireless e-mail device 37 and which contains the output data returned from execution of the selected function call. As an alternative, the output e-mail message could be directed to a different e-mail address according to an instruction provided in a parameter of the extracted command. For example, a user of wireless e-mail device 37 could request that local computer 10 retrieve the content of a particular web page and then send the retrieved content to another user's e-mail address. In addition, the output e-mail message can also be encrypted for decryption only by the e-mail application of wireless e-mail device 37, or other device to which the output e-mail message is directed. The determination of whether this encryption is to be performed is made in accordance with a command parameter provided in the received e-mail message from the wireless e-mail device.

Command server module 59 then sends the output e-mail message to wireless e-mail device 37 via server 30, connection 1, and wireless gateway 35 (step S1412). In step S1413, wireless e-mail device 37 receives the output e-mail message containing the output data for viewing by the user of wireless e-mail device 37. Flow then passes to return in step S1414. In this manner, an authorized user of a remote computing device, such as wireless e-mail device 59, can use encrypted e-mail to access and control functionality of local computer 10, including the operating system, e-mail application, web browser, or other applications of local computer 10.

The present invention provides the ability for the user of a remote computing device, such as an e-mail enabled digital pager, to access the functionality of a local computer, such as the user's home computer, through the use of e-mail messages. In this manner, the remote user can access the operating system, e-mail application, internet browser and other applications on the local computer, without the need for special software on the remote computing device, and without the need for a special connection between the remote computing device and the local computer.

Although the invention has been described with particular illustrative embodiments, the invention is not limited to the above-described embodiments and various changes and modifications may be made by those of ordinary skill in the art without departing from the spirit and scope of the invention.

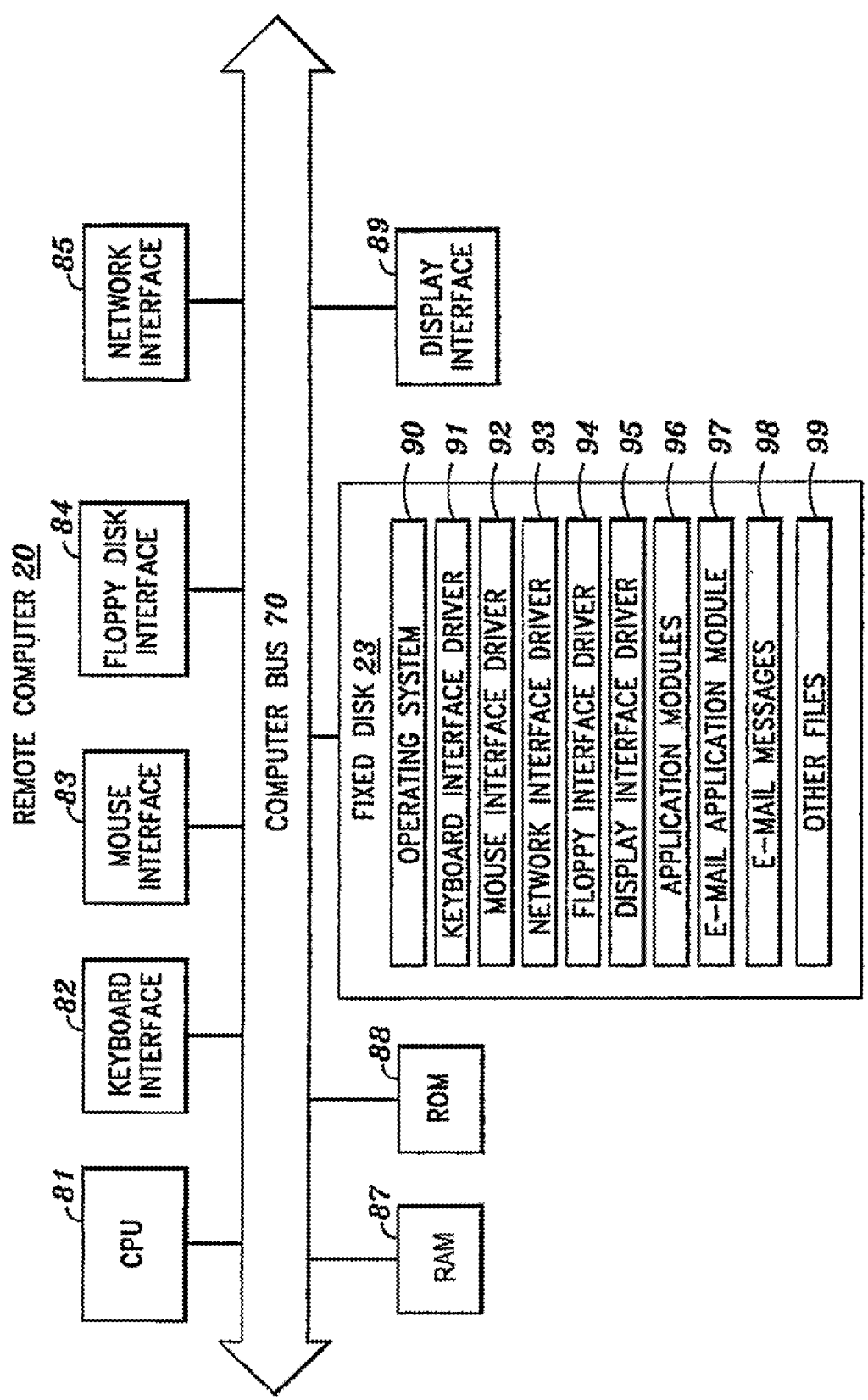

What is claimed is:

1. A method for providing control of a first computing device from a second computing device, the method comprising the steps of:
    accessing an electronic message received by an electronic message application in the first computing device, wherein the electronic message is sent from the second computing device;
    comparing an e-mail address of the received electronic message to an e-mail address database which contains at least one e-mail address, wherein each e-mail address in the e-mail address database has a corresponding access level indication to indicate which commands are allowed to be sent from the e-mail address to the first computing device;
    extracting, in the case that the e-mail address of the received electronic message is included in the e-mail address database, a command from the received electronic message, selecting from a plurality of function calls at least one function call based on the extracted command and the corresponding access level, initiating execution of the at least one selected function call, obtaining output data from the executed function call, and composing an output electronic message for the executed function call, wherein the output electronic message is directed to a specific address and contains the output data from the executed function call;
    composing, in the case that the e-mail address of the received electronic message is not included in the e-mail address database, an output electronic message which is directed to a specific address and which contains text indicating denial of access to control of the first computing device; and
    sending each output electronic message via the electronic message application to the specific address.

2. A method according to claim 1, wherein the specific address corresponds to the second computing device.

3. A method according to claim 1, wherein the specific address corresponds to a third computing device.

4. A method according to claim 1, wherein the specific address corresponds to a particular e-mail address.

5. A method according to claim 1, wherein the first computing device is a personal computer.

6. A method according to claim 1, wherein the second computing device is a personal computer.

7. A method according to claim 1, wherein the second computing device is a wireless electronic message device.

8. A method according to claim 1, wherein the second computing device is a wireless telephone having an electronic message application.

9. A method according to claim 1, wherein the second computing device is a wireless personal digital assistant.

10. A method according to claim 1, wherein the extracted command is an electronic message application command supported by the electronic message application in the first computing device, and the at least one selected function call executes the extracted command in the electronic message application.

11. A method according to claim 1, wherein the extracted command is an internet browser application command supported by an internet browser application in the first computing device, and the at least one selected function call executes the extracted command in the internet browser application.

12. A method according to claim 1, wherein the extracted command is an operating system command supported by an operating system in the first computing device, and the at least one selected function call executes the extracted command in the operating system.

13. A method according to claim 1, wherein the extracted command is an application program command supported by an application program in the first computing device, and the at least one selected function call executes the extracted command in the application program.

14. A method according to claim 1, wherein the received electronic message is accessed from the electronic message application through an electronic message application function call.

15. A method according to claim 14, wherein the electronic message application function call is an electronic message application program interface.

16. A method according to claim 1, wherein the selected function call is an application program interface for an application program which supports the extracted command.

17. A method according to claim 11, wherein the extracted command is an internet address and the output data includes text from a web page corresponding to the internet address.

18. A method according to claim 1, wherein the extracted command is an electronic message application command and the output data includes a text verification resulting from the execution of the function call corresponding to the electronic message application command.

19. A method according to claim 1, wherein the extracted command is an operating system command and the output data includes a text result which is output from the operating system in response to execution of the operating system command.

20. A method according to claim 1, wherein the extracted command is a help command and the output data includes a text description of each of a plurality of commands that are supported by the first computing device via an electronic message from the second computing device.

21. A method according to claim 1, wherein the received electronic message contains a command indicator at a predetermined location of the electronic message to indicate that a command is present within the electronic message.

22. A method according to claim 21, wherein the predetermined location is a subject line of the electronic message.

23. A method according to claim 21, wherein the command is present within a subject line of the electronic message.

24. A method according to claim 21, wherein the command is present within a body portion of the electronic message.

25. A method according to claim 1, wherein the electronic message is encrypted by the first computing device before being received by the second computing device, and wherein the received electronic message is decrypted to extract the command.

26. A method according to claim 1, wherein the command is contained in a body portion of the received electronic message.

27. A method according to claim 1, wherein the e-mail address database contains a list of e-mail addresses for which access is allowed to send commands to the first computing device.

28. A method according to claim 1, wherein, in the case that the access level indication corresponding to the e-mail address of the received electronic message indicates that e-mail address is not allowed to execute the command contained in the received electronic message, a function call corresponding to the extracted command is not executed and the output electronic message contains text indicating that access to the first computing device is denied.

29. A method according to claim 28, wherein a warning output electronic message is composed and sent to a user of the first computing device to indicate that access has been denied to the first computing device.

30. A method according to claim 1, wherein a verification output electronic message is composed and sent to the e-mail address of the received electronic message to confirm whether the command contained in the received electronic message is to be executed.

31. A method according to claim 30, wherein, in the case that the first computing device does not receive a response electronic message in response to the verification output electronic message, the first computing device does not execute the function call corresponding to the command in the received electronic message.

32. A method according to claim 1, wherein the method is performed by a command server module hosted in the first computing device.

33. A method according to claim 1, wherein the extracted command is a request for an operating system in the first computing device to open a communication port to the second computing device.

34. A computer-readable medium which stores computer-executable process steps, the computer-executable process steps to provide control of a first computing device from a second computing device, said computer-executable process steps comprising process steps executable to perform a method according to any one of claims 1 to 26, 27, and 28 to 33.

35. A first computing device for providing control of the first computing device from a second computing device, said first computing device comprising:
- a program memory for storing process steps executable to perform a method according to any one of claims 1 to 26, 27, and 28 to 33; and
- a processor for executing the process steps stored in said program memory.

* * * * *

UNITED STATES PATENT AND TRADEMARK OFFICE
CERTIFICATE OF CORRECTION

PATENT NO. : 7,127,491 B2
APPLICATION NO. : 10/200137
DATED : October 24, 2006
INVENTOR(S) : Robert Charles Zirnstein, Jr.

It is certified that error appears in the above-identified patent and that said Letters Patent is hereby corrected as shown below:

IN THE DRAWINGS: As shown in the attached
Sheet 2, Figure 2, "ROM" in box 47 should read --RAM--;
Sheet 3, Figure 3, "ROM" in box 87 should read --RAM--; and
Sheet 4, Figure 4, "ROM" in box 105 should read --RAM--.

COLUMN 12
Line 9, "e20 mail" should read --e-mail--.

COLUMN 14
Line 51, "form" should read --from--.

Signed and Sealed this

Twelfth Day of June, 2007

JON W. DUDAS
*Director of the United States Patent and Trademark Office*